United States Patent [19]
Isley et al.

[11] 3,923,439
[45] Dec. 2, 1975

[54] SYSTEM FOR CONTROLLING THE ECCENTRICITY OF AN EXTRUDED ARTICLE

[75] Inventors: Arthur Merle Isley; Robert Wayne Rake, both of Phoenix; Albert Sanford Tingley, Glendale, all of Ariz.

[73] Assignee: Western Electric Company, Incorporated, New York, N.Y.

[22] Filed: July 30, 1974

[21] Appl. No.: 493,200

Related U.S. Application Data
[62] Division of Ser. No. 296,505, Oct. 10, 1972.

[52] U.S. Cl. ............... 425/150; 425/381; 425/466
[51] Int. Cl.² ........................................ B29D 23/04
[58] Field of Search ........... 425/113, 135, 150, 381, 425/466; 264/40; 73/67, 67.85

[56] References Cited
UNITED STATES PATENTS

| | | | |
|---|---|---|---|
| 2,765,441 | 10/1956 | Gambrill | 425/135 X |
| 2,980,958 | 4/1961 | Ellis, Jr. | 425/113 |
| 3,290,995 | 12/1966 | Pull | 90/24 |
| 3,368,007 | 2/1968 | Palmer | 264/40 |
| 3,748,577 | 7/1973 | Jones, Jr. | 324/61 R |
| 3,775,035 | 11/1973 | Scotto et al. | 264/40 X |
| 3,827,287 | 7/1972 | Boggs et al. | 73/67.85 |

FOREIGN PATENTS OR APPLICATIONS

| | | | |
|---|---|---|---|
| 162,462 | 4/1955 | Australia | 425/113 |
| 2,080,150 | 11/1971 | France | 73/67.85 |
| 1,037,697 | 8/1958 | Germany | 425/113 |
| 373,176 | 12/1963 | Switzerland | 425/113 |

Primary Examiner—Richard B. Lazarus
Attorney, Agent, or Firm—A. C. Schwarz, Jr.

[57] ABSTRACT

A cable core is advanced longitudinally through an extruder head where a protective tubular plastic jacket is formed therearound. A sensing device coupled to a test set monitors jacket eccentricity along a pair of normal, coplanar cross-sectional axes, generating a pair of polarized analog signals which are coupled to a level detector which generates outputs indicating on which side of each axis the jacket is eccentric. The outputs of the level detector are coupled to a logic circuit, synchronized by a clock, which gates the outputs of first and second oscillators selectively to one of two inputs of first and second drive circuits associated with first and second reversible stepping motors. A first slide is mounted for rectilinear movement slidably within a second slide mounted for transverse rectilinear movement. The stepping motors selectively drive the slides to impart translational movement to the first slide, which is coupled to one end of a core tube pivotally mounted in the extruder head to position the other end of the core tube adjustably within a passageway formed in an extrusion die in the head, automatically to correct any measured jacket eccentricity. Alternatively, the stepping motors may be controlled manually through a lever-actuated switch to vary the relative position of the core tube and the die without the eccentricity signals. Additionally, third and fourth stepping motors may be driven in synchronism with the first and second stepping motors, respectively, to drive a cross hair display which indicates visually the position of the core tube with respect to the die.

8 Claims, 11 Drawing Figures

SYSTEM FOR CONTROLLING THE ECCENTRICITY OF AN EXTRUDED ARTICLE

This is a division, of application Ser. No. 296,505 filed Oct. 10, 1972.

BACKGROUND OF THE INVENTION

1. Field of the Invention

The present invention relates to a system for controlling the eccentricity of an extruded article, and more particularly, to a system for automatically controlling the eccentricity and uniformity of a plastic jacket being extruded onto an elongated article, for example, a cable core.

2. Technical Considerations and Prior Art

A continuing problem in the manufacture of cables having a plastic insulating sheath or jacket extruded therearound has been the control of the eccentricity and wall thickness of the jacket. The eccentricity of a cable jacket is manifested by variations of the wall thickness or non-uniformity of the cable jacket in a cross-sectional plane. It must be controlled to make the thickness of the jacket around the periphery of the inner cable core uniform to avoid concentrations of stress in the thinner wall sections when the cable is bent during handling, which can seriously affect the mechanical strength of the cable, decrease the life thereof and result in fracturing of the cable jacket.

In the past, plastic jacketing material has been applied to a wire or a cable core in a crosshead type extrusion apparatus wherein a hollow core tube through which the core was advanced was in a fixed position relative to a die therein and could be adjusted to correct any variations in the eccentricity of the applied jacket only by shutting down the apparatus and dismantling the crosshead to facilitate the adjustment. Often several adjustments were needed in order to obtain cable of acceptable quality. Even though several adjustments were made there was no assurance that further adjustments would not be necessary as the melt temperature or speed of the extrusion screw changed.

Although the prior art includes at least one example of a core tube which is capable of being adjusted without dismantling the crosshead, these adjustments must be performed mechanically on a hot apparatus, thus creating the risk of operator injury. Moreover, the adjustment may be time-consuming and is dependent upon the skill of the operator and the accuracy of the monitoring equipment, if any, which provides information relating to the eccentricity of the jacket.

SUMMARY OF THE INVENTION

It is an object of the present invention to provide a new and improved system for controlling the eccentricity of an extruded tubular plastic article.

It is another object of the present invention to provide a new and improved system for manually or automatically controlling the eccentricity of a tubular plastic jacket being extruded onto an elongated article, for example, a wire or a cable core.

It is another object of the present invention to provide a new and improved apparatus for extruding a tubular article, for example, a plastic jacket being applied to an elongated core.

A system for controlling the eccentricity of an extruded tubular plastic article, embodying certain features of the present invention, may include means for measuring the eccentricity of the tubular article along a diametric cross-sectional axis therethrough, means for generating an analog quantity representing the measured eccentricity, means for translating the analog quantity into a mechanical movement and means for imparting the movement to an axial forming member disposed in an axial extrusion passageway to alter an extrusion orifice defined between the passageway and the member to compensate for the measured eccentricity.

BRIEF DESCRIPTION OF THE DRAWINGS

The objects and various features of the present invention will be more readily understood from the following detailed description thereof, when taken in conjunction with the following drawings wherein.

DETAILED DESCRIPTION

GENERAL DESCRIPTION OF THE APPARATUS

Figure 1:
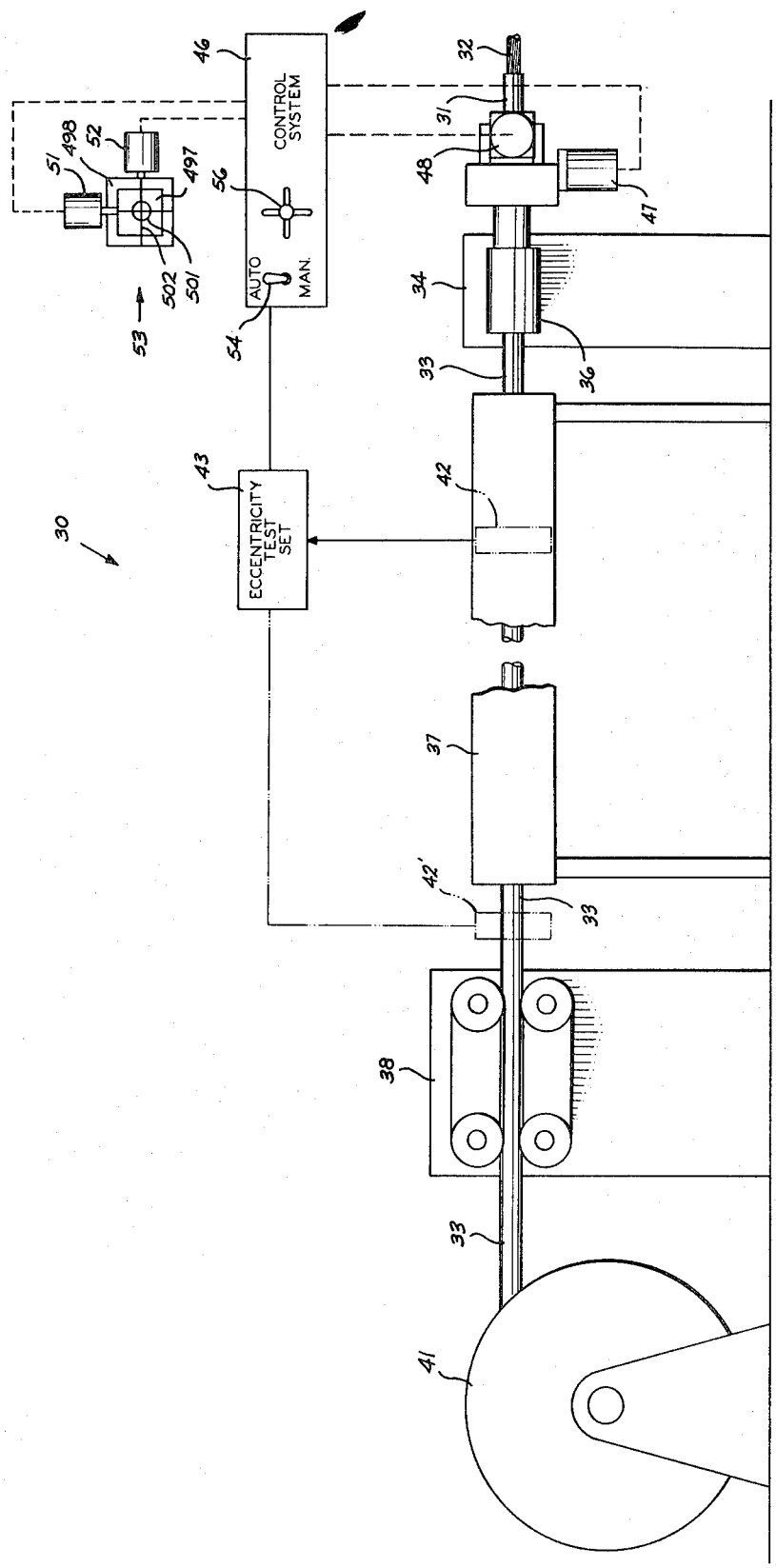
FIG. 1 is a side elevational view of an extrusion apparatus and a control system therefor, in accordance with the principles of the invention, for applying a plastic jacket concentrically around a longitudinally moving cable core.

Referring to FIG. 1, there is shown an apparatus 30 for forming a protective tubular convering or jacket 31 around an elongated article, such as a cable core 32, to form a jacketed cable 33. The jacket 31 may be an insulating plastic material, for example, polyethylene. The apparatus 30 includes a horizontal extruder 34 having a crosshead 36 wherein the jacket 31 is extruded controllably onto the core 32, after which the cable is passed through an elongated cooling trough 37, being advanced therethrough by a capstan 38 onto a takeup reel 41.

The cable 33 is monitored for eccentricity of the extruded covering 31 thereon through a sensing means 42, which is, for reasons explained more fully below, preferably located within the cooling trough 37, but may be located elsewhere, for example, between the cooling trough 37 and the capstan 38, coupled to a test set 43 which feeds back the monitoring information to an extruder control system 46. The control system 46 automatically and selectively drives first and second stepping motors 47 and 48, which, as will be seen below, selectively vary the position of a pivotally mounted forming member disposed in an extrusion passage in the crosshead 36 to correct any monitored eccentricities of the jacket 31 on the core 32. The control system 46 further selectively drives third and fourth stepping motors 51 and 52, in synchronism with the motors 47 and 48 to adjust a visual display 53 of the coordinate positioning of the forming member in the crosshead 36.

A selector switch 54 may be set from an automatic (AUTO) to a manual (MAN) position whereby a lever operated switch 56 can be utilized to position the tube forming member in the crosshead 36 as determined by an operator.

ECCENTRICITY ADJUSTING APPARATUS

Figure 2:
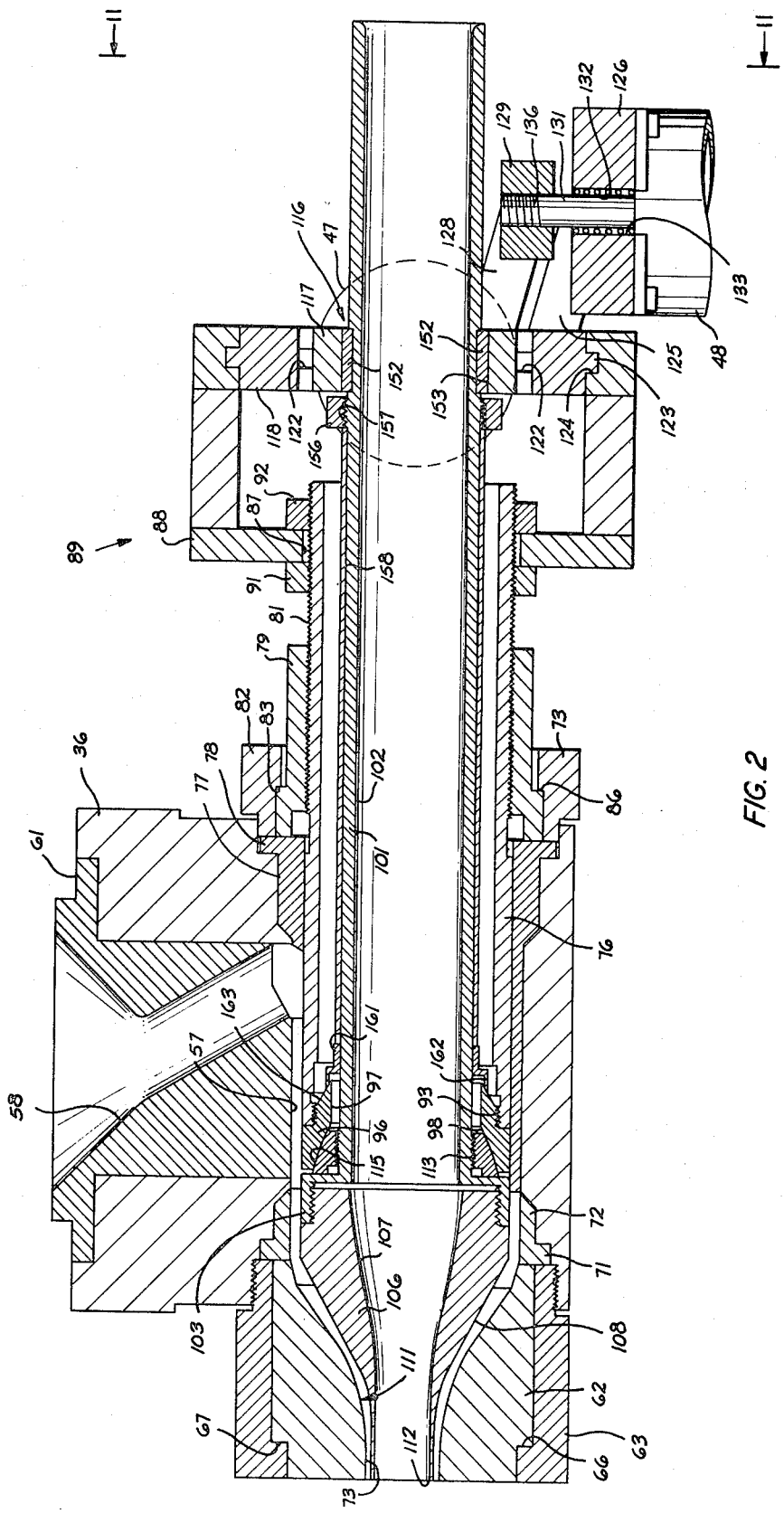
FIG. 2 is a plan sectional view of part of the apparatus of FIG. 1, particularly illustrating a pivotally mounted forming member capable of being selectively positioned within a die in an extruder crosshead by a pair of selectively energizable stepping motors.

As shown in FIG. 2, crosshead 36 is formed with an axial passageway 57 which communicates with a feed port 58 formed in a velocity block 61 in the crosshead 36. A forming die 62 is removably positioned in the leading end of the passageway 57 by a retainer 63 threaded or bolted into the crosshead 36 and formed with an annular step 66 abutting an annular shoulder 67 formed on the die 62.

The retainer 63 and the die 62 abut a flanged end 71 of a filler ring 72 disposed in the head 36, such that a converging passageway 73 formed in the die 62 communicates with and forms a continuation of the extrusion passageway 57.

A hollow, cylindrical guider tube 76 is axially aligned in the passageway 57, being disposed in a frustocylindrical holder 77, formed with an annular flange 78, coaxially disposed in the head 36. An adjusting nut 79, threaded onto a threaded portion 81 of the guider tube 76, abuts the flange 78 of the holder 77, retaining it in the passageway 57, and is retained thereagainst by a clamp 82 having a step 83 formed therein abutting a shoulder 86 formed on the adjusting nut 79.

The threaded portion 81 of the guider tube 76 projects rearward out of the crosshead 36 and extends through an aperture 87 formed in an end plate 88 of a motor supporting bracket 89. A pair of locking rings 91 and 92 threaded onto the guider tube 76 retain the bracket 89 rigidly thereon such that the guider tube 76 provides support for the bracket 89.

The forward end of the guider tube 76 is formed with an internally threaded section 93 for threadedly receiving an annular member 96 formed with an opening 97 which communicates with a concave spherical bearing race surface 98 formed therein. A movable adjusting tube 101, formed with an axial passageway 102 therethrough, for passing the core 32, includes an enlarged cylindrical end 103, internally threaded to receive a core tube or forming member 106, formed with a converging passageway 107 therethrough which communicates with and forms a continuation of the passageway 102 through the adjusting tube 101.

The core tube 106 is formed with an external converging surface 108 and is disposed within the passageway 73 formed in the die 62 to define an annular extrusion orifice 111 between the surface 108 of the core tube 106 and the passageway 73 formed in the die 62. A cylindrical end 112 of the core tube 106 projects slightly beyond the end of the die 62 or may be coplanar therewith.

A bearing member 113, threaded onto the adjusting tube 101 adjacent to the enlarged portion 103 thereof, is formed with a spherical bearing surface 115 disposed in and engaging the race 98 formed in the member 96. The arrangement of the members 96 and 113 define a swivel joint or universal between the adjusting tube 101 and the guider tube 76.

Figure 3:
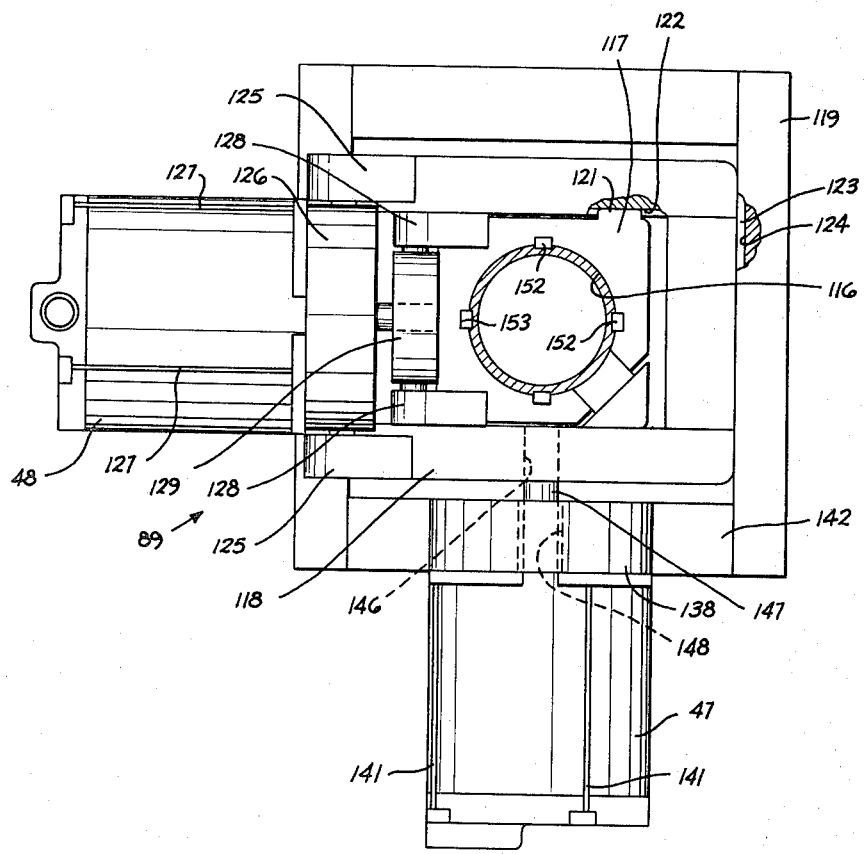
FIG. 3 is an end view of the apparatus of FIG. 2.

As shown in FIGS. 2 and 3, the rearward end of the adjusting tube 101 projects out of the guider tube 76 through an aperture 116 formed in a first slide 117 is supported in and is mounted for horizontal rectilinear movement in a second supporting slide 118 which is mounted for vertical rectilinear movement in a pair of end braces 119—119, each of which is supported at each end thereof by a pair of cross-braces 120—120 welded to the end plate 88 of bracket 89. The slide 117 is formed on its lateral outside edges with tongues 121—121 which project into a pair of spaced aligned elongated grooves 122—122 formed in the lateral inside edges of slide 118. Similarly, the transverse lateral outside edges of the slide 118 are formed with tongues 123—123 which project into aligned, spaced elongated grooves 124—124 formed in the end braces 119—119.

A first pair of parallel support arms 125—125, welded to the second slide 118, extend rearwardly therefrom and are fixed to diametrically opposite sides of a cylindrical supporting bracket 126, upon which is mounted the stepping motor 48. As shown in FIG. 3, the stepping motor 48 is supported on the bracket 126 by a plurality of threaded rods 127—127, longitudinally arranged circumferentially around the housing of the motor 48. A second pair of parallel support arms 128—128 are welded to the slide 117, extending rearwardly therefrom, and are fixed to diametrically opposite sides of a cylindrical coupling member 129.

A motor drive shaft 131, selectively rotatable incrementally in opposite directions about a longitudinal axis, extends from the stepping motor 48 through bearing means 132 supported in an aperture 133 formed in the bracket 126, into a threaded bore 136 formed in the coupling member 129. The end of the drive shaft 131 projecting from the motor 123 may be threaded or, alternatively, may have a threaded member fixed thereon to drive the slide 117 reversibly in horizontal rectilinear directions through the coupling member 129 and the arms 128—128 when the motor shaft 131 is rotated in opposite directions.

The stepping motor 47 is mounted on a cylindrical support bracket 138 by threaded rods 141—141. The support bracket 138 is supported between opposite end braces 119—119 by a pair of support braces 142—142.

The slide 118 is formed on one side with a threaded bore 146 for receiving a threaded end of a drive shaft 147 of the motor 47, which is selectively rotatable reversibly about a longitudinal axis, and extends through a bearing means 148 disposed in an aperture 151 formed in the bracket 138. The motor 47 may be operated reversibly to rotate the shaft 147 incrementally to impart vertical rectilinear movement in opposite directions to the slide 118 and simultaneously to the slide 117 and the motor 48 supported thereby. Four bearing members 152—152, are disposed at four equally spaced points around the circumference of that portion of the adjusting tube 101 passing through the aperture 116 in the slide 117, in spaced notches 153—153 extending radially outward from the aperture 116. The purpose of the bearing members 152—152 is to permit the slide 117 to be moved horizontally, vertically or both horizontally and vertically selectively to impart pivotal movement to the unitary core tube/adjusting tube structure without deforming the tube 101.

The pressure with which the spherical bearing surface 115 of the bearing member 113 bears against the spherical race 98 formed in the member 96 may be adjusted by rotating a locking ring 156 threaded onto an annular externally threaded section 157 of the adjusting tube 101. The ring 156 abuts a sleeve 158 disposed around the cylindrical periphery of the adjusting tube 101, which abuts a cylindrical collar 161, also disposed around the adjusting tube 101, and formed with an enlarged cylindrical portion 162, the annular edge of which bears against an external spherical surface 163, formed annularly around the member 96. This provides sealing between the guider tube 76 and the extrusion passageway 57 to prevent any leakage of the plastic compound from the extrusion passageway 57 into the clearance space between the guider tube 76 and the diametrically smaller adjusting tube 101.

Actuation of the stepping motors 48 and 47 imparts translational movement to the slide 117 in a plane transverse to the longitudinal axis of the extrusion passageway 57.

The translational movement of the slide 117 is imparted to the trailing end the adjusting tube 101 coupled thereto to pivot the leading end of the adjusting tube 101 with respect to the guider tube 76, selectively to alter the annular extrusion orifice 111 defined between the periphery 108 of the core tube 106 and the passageway 73 through the die 62, by varying the distance between adjacent sections of the surface 108 of core tube 106 and the forming surface 73 of the die 62.

Plastic compound is worked and delivered from an extrusion bore (not shown) through the feed port 58 into the extrusion passageway 57 flowing circumferentially around a portion of the surface of the guider tube 76 into the annular extrusion orifice 111 issuing therefrom onto the core 32 as it is passed through the adjusting tube 101 and exits from the passageway 107 at or beyond the exit end 112 of the core tube 106 and the die 62.

Thus by selectively actuating the stepping motors 47 and 43, the wall thickness of the plastic jacket 31 around the cable core 32 may be selectively made uniform to control the eccentricity of the jacket 31 around the core 32 continuously without shutting down the apparatus or making a multiplicity of adjustments thereto.

ECCENTRICITY MONITORING SYSTEM

Though several types of monitoring equipment may be utilized to monitor the jacket eccentricity in a plane transverse to the longitudinal direction of the advancing cable 33, it is preferred to utilize the ultrasonic cable jacket thickness and eccentricity monitor disclosed in application Ser. No. 268,961, filed July 5, 1972 now U.S. Pat. No. 3,827,287, issued on Aug. 6, 1974, in the name of L. M Boggs et al and application Ser. No. 268,973, filed July 5, 1972, in the name of L. M. Boggs, et al all of which are assigned to the assignee of the instant application.

The said monitor has several advantages over the available prior art, particularly in that it is tailored to the needs of monitoring the eccentricity of successive sections of cable jacket on a core immediately following extrusion and renders an output for only those measurements which are meaningful. Because the system is ultrasonic, measurements can be made on the cable without physical contact between a sensor and the hot jacket. Moreover, since an ultrasonic system requires a coupling medium, the cooling trough 37 is an ideal sensor location since the water therein can provide a coupling medium between a sensor and the cable, and its proximity to the extrusion head 36 permits immediate detection of eccentricity or out-of-roundness of the cable jacket. Furthermore, the application of ultrasonic techniques does not depend on the cable having a conductive shield under the jacket and thus does not require grounding of such a shield as do, for example, the capacitance monitoring techniques of the prior art.

Generally, an ultrasonic crystal is pulsed to produce a ringing signal at the natural frequency of the crystal which is transmitted to the cable jacket through the medium of the water in the cooling trough to impinge on the outer surface of the jacket. Part of the signal impinging on the jacket is transmitted through the jacket material and part is reflected back to the transmitting crystal. A second reflection or echo, is reflected from the interface of the jacket and the cable core and reaches the crystal in a period of time directly related to the thickness of the cable jacket. The time difference between the reflections from the outer and inner surfaces of the jacket are processed to determine the thickness of the jacket.

If four such crystal transducers are disposed in the cooling trough circumferentially around and radially spaced from the cable passing therethrough in a coplanar arrangement such that alternative ones of the spaced transducers are coaxially arranged on diametrically opposite sides of the cable, the differences in the thickness measurements of each pair of transducers may be utilized to indicate jacket eccentricity along two coplanar coordinate axes. These eccentricity measurements may thereafter be processed selectively to drive the stepping motors 47 and 48 to position the core tube 106 relative to the die 62 to adjust the extrusion orifice 111 automatically to compensate for detected eccentricities.

Figure 4:
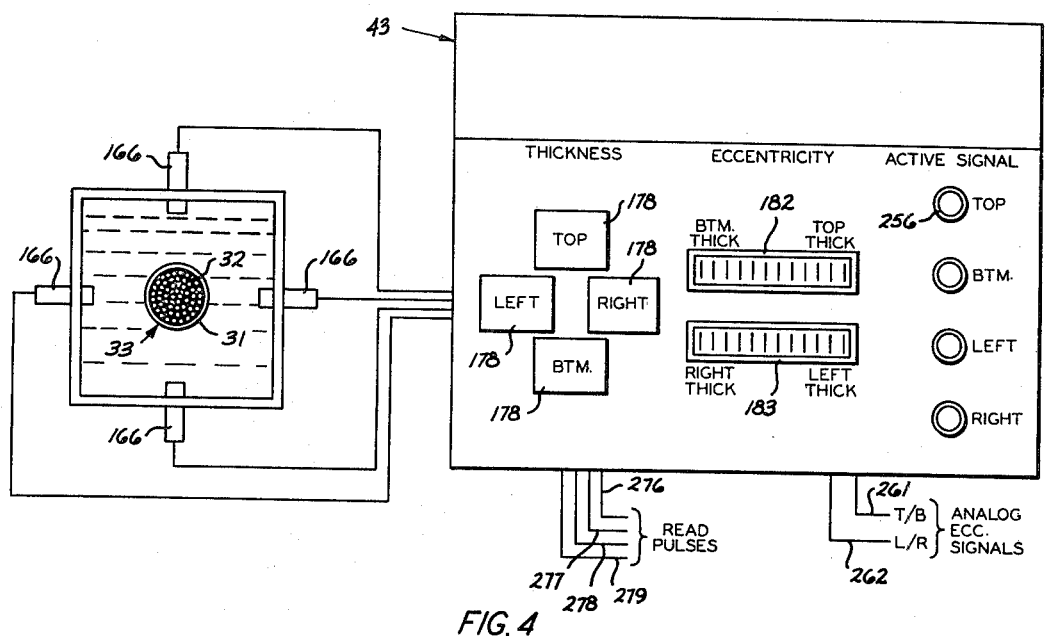
FIG. 4 is a cross-sectional view of a cable cooling trough showing the arrangement therein of four crystal transducers associated with one type of cable jacket eccentricity monitor, represented by an illustration of the front panel thereof, being part of the control system of FIG. 1.

As can best be seen in FIG. 4, the sensing means 42 includes four crystals 166—166 disposed circumferentially around and radially spaced from the circumference of the cable 33 with each of the crystals being immersed in the cooling medium, e.g., water, of the cooling trough 37.

The crystals 166—166 are excited by a voltage impulse which causes mechanical stresses in the crystalline material. These stresses generate high frequency pressure gradients or waves in the water of the cooling trough. The waves, varying in intensity as a damped sinusoid, propagate to the outer surface of the cable jacket 31 where part of the energy is reflected back to the crystal as an echo, due to the acoustical impedance mismatch between the water and the jacket.

Part of the energy of the pressure wave continues through the cable jacket 31 where a second echo reflection occurs at the inwardly facing surface of the cable jacket, due to the acoustical impedance mismatch between the inner surface of the jacket and the core 32.

The time separation of the echoes relates directly to the wall thickness of the cable jacket 31. Since the velocity of sound in polyethylene is substantially uniform, the equation, $2d = vt$ where $d$ = jacket thickness, $v$ = sound velocity, and $t$ = echo separation time, may be used. The echo separation time is measured, and knowing $v$ (about 20 mils per microsecond for polyethylene), $d$ is readily determined.

Figure 5:
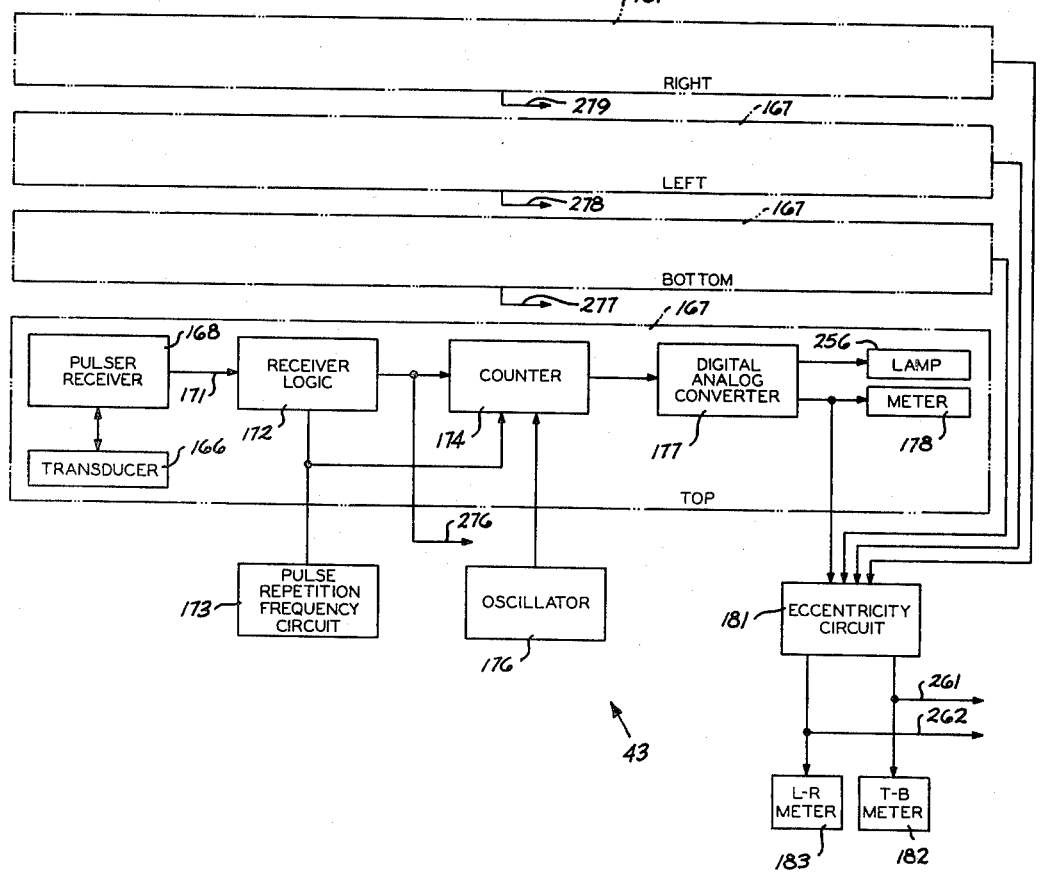
FIG. 5 is a block schematic diagram of the eccentricity monitor of FIG. 4.

Referring to FIG. 5, each of the crystals 166—166 is connected electrically to an associated one of a plurality of channels 167—167, for converting the time interval between the pulse echoes received from the interfaces of the cable jacket aligned with an associated crystal 166 to an output which is proportional to the thickness of the cable jacket 31.

The channel outputs are combined to determine the eccentricity of the cable jacket 31 along coplanar coordinate axes, which, for convenience are designated the vertical or top-bottom axis ($t$-$b$) and the horizontal or left-right axis ($1$-$r$).

Referring again to FIG. 5, each of the channels 167—167 includes one of the crystals 166—166 coupled to an associated pulser receiver circuit 168, which transmits a pulse to the crystal 166 during each cycle of operation of the test set 43 to cause the crystal to ring at its natural frequency. Subsequently, during each cycle, the pulser receiver 168 functions to receive pulse echoes from the moving cable 33.

The pulser receiver 168 is coupled through an output 171 to a receiver logic circuit 172 which, upon command from a pulse repetition frequency (PRF) circuit 173, causes the pulser receiver 168 to pulse the associated transducer crystal 166. The receiver logic circuit 172 validates echo pulses received from the cable 33, discarding those pulses not pertinent to the measurement of the thickness of the jacket 31. The receiver logic circuit has the inherent intelligence to discriminate between noise spikes and valid signals as well as to differentiate between the first and second echo signals.

The receiver logic circuit 172 is coupled to a counter 174 which counts for the width of an output pulse from the receiver logic circuit 172. The counter 174 is pulsed by an oscillator 176 and stores the pulse count in a buffer memory therein (not shown) provided that the pulses received by the pulser receiver 168 are validated by the receiver logic circuit 172.

Subsequently, the stored digital count from the counter 174 is transferred to a digital-to-analog converter 177 which converts the digital count to a correspondingly related analog voltage. This voltage is an indication of jacket thickness for the associated channel. The continuous analog voltage, appropriately scaled, is displayed on a meter 178 associated with the channel 167. This permits an operator to monitor continuously the thickness "$d$" of the cable jacket at a portion of the periphery associated with the channel.

In order to measure the eccentricity of the cable jacket 31, an eccentricity measuring circuit 181 is connected to the output of the converter 177 of each one of the channels 167—167. The eccentricity measuring circuit 181 compares the jacket thickness "$d$" at the top and bottom of the cable jacket 31 as viewed in FIG. 4, and the jacket thickness at the left and right hand sides thereof, rendering a polarized analog output of the jacket eccentricity along each of the two coordinate axes.

The eccentricity measuring circuit 181 subtracts the bottom thickness measurement from the top thickness measurement of the jacket 31, as viewed in FIG. 4, with the result being multiplied by 100 and divided by the nominal jacket thickness to yield a percent of nominal jacket thickness. A similar operation is performed with respect to the thickness at the left and right hand portions of the cable jacket 31. These measurements are displayed on a top-bottom meter 182 and a left-right meter 183 associated with the eccentricity measuring circuit 181.

Figure 6:
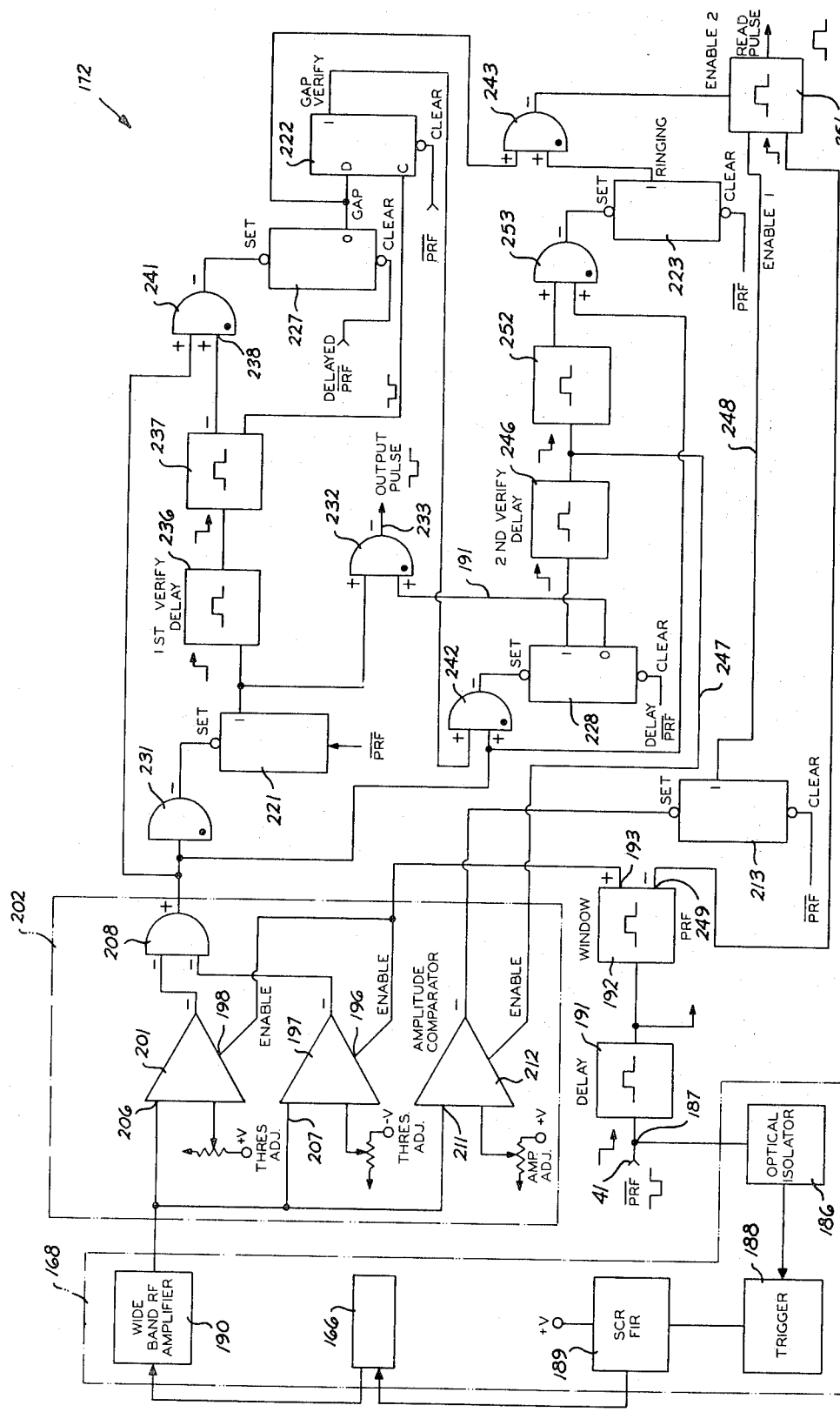
FIG. 6 is a detailed schematic diagram of a receiver logic circuit associated with the eccentricity monitor of FIGS. 4 and 5.

As seen from FIG. 6, the pulser-receiver 168 includes an optical isolator 186 which receives a PRF pulse through a junction point 187 in the receiver logic circuit, delivering a pulsed output to a triggering circuit 188 which triggers a silicon controlled rectifier (SCR) firing circuit 189, which provides a ringing pulse for an associated crystal 166.

A wide-band, low noise, $r$-$f$ amplifier 190, receives and amplifies the echo signals from the cable jacket 31 reflected back to the transducer 166. The low level current return signals are amplified to approximately a one to three volt level.

Because of the known distance between each transducer 166 and the cable 33 together with the velocity of propagation of sound in water, the time interval during which pulse echo signals may be expected is generally known. Therefore, the ultrasonic test set 43 is designed to accept pulse echo signals during this time interval only, which is referred to hereinafter as the "window width."

Figure 7:
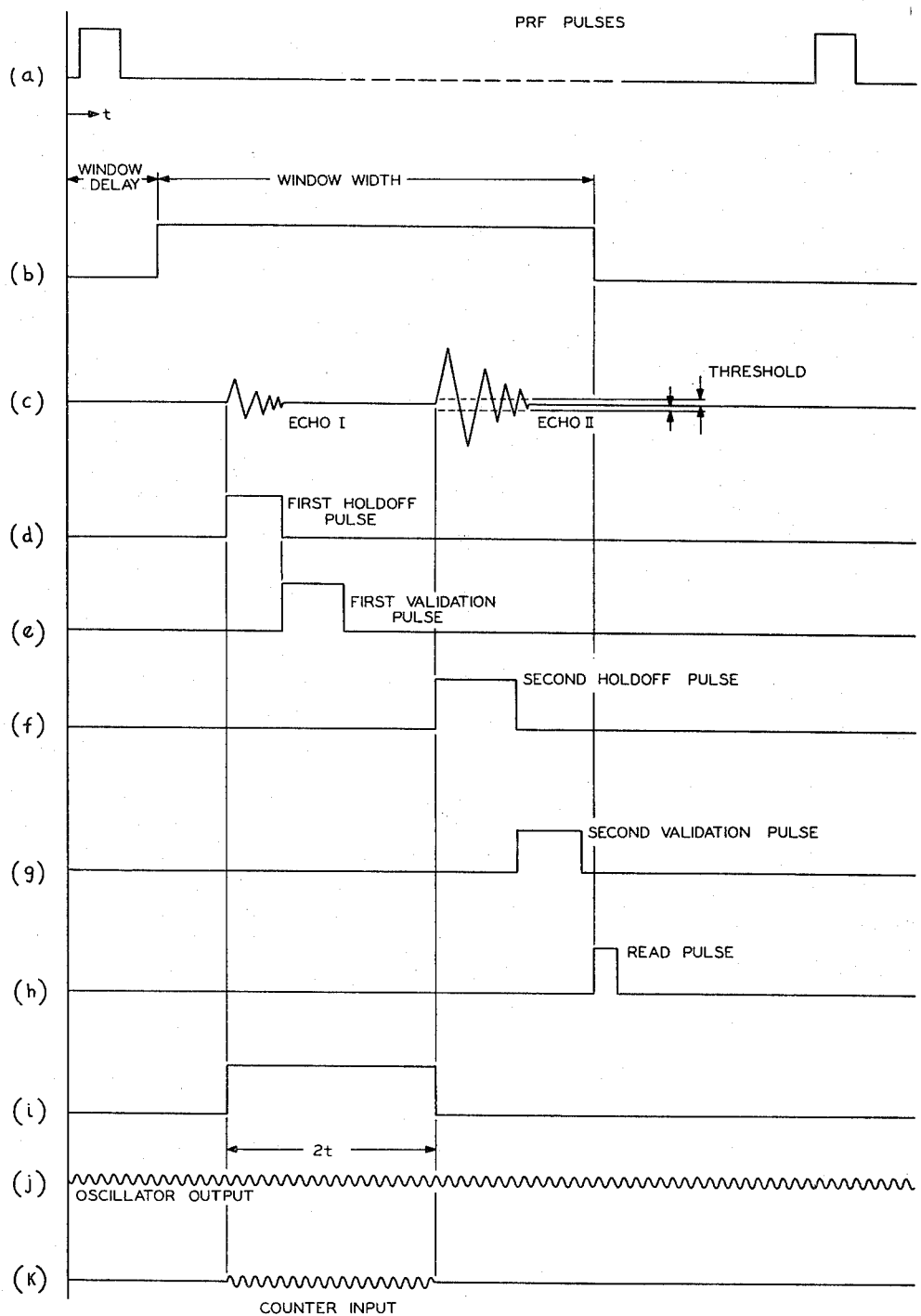
FIG. 7 illustrates various waveforms associated with the schematic diagram of FIG. 6.

Experiments indicate that the first echo (FIG. 7 ($c$) I) is much lower in amplitude than the second echo (FIG. 7 ($c$) II) due to a greater acoustical mismatch at the inner surface of the jacket 31, which is at a higher temperature than the outer surface. Also, the second echo has a much longer duration than the first echo. These signal characteristics are used to advantage in the receiver logic circuit 172. For example, on inner jacket measurements, signal amplitudes vary considerably due to surface irregularities, and if echo amplitude or duration momentarily drops below minimums, an incorrect measurement is not made. Instead, the last previous good measurement is retained in a buffer register in the counter 174 to maintain a correct thickness output.

The receiver logic circuit 172 is designed to verify the following expected signal characteristics: (1) that the signal echoes occur in a predetermined time span after the transmitted pulse; (2) that the initial polarity of either echo is indeterminate; (3) that the first echo is short in time duration compared to the second echo; (4) that a time interval of at least 200 nanoseconds exists between the first and second echo; (5) that the amplitude of the second echo is greater than the minimum required of the first echo; and (6) that the second echo has a time duration of at least 0.700 microseconds. If these characteristics are met for a particular signal, the receiver logic circuit 172 delivers a validating pulse to the counter 174, to cause the latter to store a count recorded during the time $2t$ as valid data. The validating pulse is also delivered to the control system 46 to insure that adjustments in the extruder head 36 are made according to valid data. These validity pulses from the receiver logic circuit 172 are referred to as "read+" pulses.

The junction point 187 is connected to a one-shot multivibrator 191 which generates a delayed PRF output to a second one-shot multivibrator 192. One output 193 of the one-shot 192 is connected to an enabling input 196 of a positive voltage threshold detector or comparator 197 and an enabling input 198 of a negative voltage threshold detector 201.

The threshold detectors 197 and 201 form part of a comparator circuit 202 in the receiver logic circuit 172. The threshold detectors 197 and 201 are set to detect at as low a level as possible, just above an expected noise level.

The comparator 202 receives the RF output from the wide band amplifier 190 at inputs 206 and 207 of the threshold detectors 201 and 197, respectively.

The detectors 201 and 197 have negative true cutputs when the thresholds thereof are exceeded. The outputs of both threshold detectors are fed to a NOR gate 208. If either threshold output is negative or low, the output of the NOR gate 208 will be positive or high.

In order to test the peak amplitude of the second echo pulse, the output of the wideband amplifier 190 is also coupled to an input 211 of an adjustable amplitude comparator 212 of the comparator circuit 202. The output of amplitude comparator 212 is connected to a "set" input of a flip-flop 213 having its reset input coupled to the output of the PRF circuit 173.

The remainder of the receiver logic circuit 172 includes familiar logic circuit elements, the operation of which are well-known. All of the logic elements, i.e., NAND gates, NOR gates, flip-flops and one-shots are described in terms of positive logic where a high or positive level voltage represents or exhibits a binary 1 and a low or zero level voltage represents a binary 0.

The PRF circuit 173 applies a pulse (FIG. 7 (a)) to the optical isolator 186, which responds by supplying a triggering pulse to the triggering circuit 188. The triggering circuit 188, when triggered, applies a positive potential to the SCR firing circuit 189, causing a capacitor therein (not shown) to discharge, applying a voltage pulse to the associated transducer 166. The pulse applied to the transducer 166 is a negative pulse of 200–250 volts in magnitude and approximately 60 nanoseconds in duration. The application of this pulse to the transducer 166 causes the transducer to generate pressure waves which impinge upon the aligned sections of the jacketed cable 33. An instant after the SCR firing circuit 189 fires, current from a source connected at a terminal 216 charges the capacitor.

The receiver logic circuit 172 tests the validity of echo pulses received in accordance with predetermined test characteristics determined at least in part by the material of the jacket 31 under test and yields a positive going read pulse should the echo pulses received by the pulser-receiver 168 be within a predetermined amplitude range. The receiver logic circuit 172 includes logic circuitry for making outside and inside band determinations for the echo pulses. Should the amplitude of the echo pulses received by the pulser receiver 168 be in excess of a predetermined amplitude, the circuit will register a negative or outside band pulse.

A valid set of pulse echoes received by the pulser receiver 168 are spaced a time 2t apart with the first echo pulse occurring approximately 40–120 microseconds after the initiation of the cycle by the PRF pulse. The first echo pulse occurs when the pulse transmitted by the associated ringing transducer crystal 166 engages the outwardly facing surface of the jacket 31. The second echo pulse occurs when the unreflected portion of the pulse transmitted by the transducer crystal 166 strikes the inwardly facing surface of the jacket 31.

During the window-width (FIG. 7 (b)) of approximately 90–120 microseconds duration, a hold-off pulse (FIG. 7 (d)) is generated by the receiver logic circuit 172 upon receiving a first echo with a validation pulse (FIG. 7 (e)) beginning immediately after the first hold-off pulse ends. It is desirable that the first validation pulse occur after the amplitude decay of the first echo pulse. Thereafter, at the beginning of the second echo pulse, a second hold-off pulse (FIG. 7 (f)) is generated with a second validation pulse (FIG. 7 (g)) beginning at the conclusion of the second hold-off pulse. The second validation pulse occurs, unlike the first validation pulse, during the decay of the second echo pulse, which indicates that the second echo pulse is outside of the predetermined limits of the threshold band.

If the receiver logic circuit 172 receives a negative output from NOR gate 208 from an apparent first echo, the receiver logic circuit does not look for a second echo and hence does not generate a read pulse (FIG. 7 (h)) for the first cycle.

The validation pulse also avoids the false pickup of noise signals which may be due to air bubbles in the water medium of the cooling trough 37. If a noise signal precedes the first echo pulse, the circuit picks up the noise signal as a first echo and subsequently attempts to validate the true first echo as an apparent second echo. Should this occur, the receiver logic circuit, not receiving an expected sequence, does not cause a read pulse to be generated.

Additionally, the PRF circuit 173 controls the operation of the channels 167—167 and the interaction thereof. In order to accomplish this, the PRF circuit 173 generates four pulse signals, one for each of the channels 167, each with approximately a one millisecond period. The four pulses are staggered by approximately 250 microseconds, thereby causing the staggering of the operating sequence of the four channels. In this way, and starting with the top channel 167, proceeding then to the bottom, then left and right channels, all of the activity of significance in the top channel occurs within the first 250 microseconds prior to the generation of the shifted pulse associated with the bottom channel.

The PRF circuit 173 conditions the receiver logic circuit 172 for each cycle of operation. A pulse from the PRF circuit 173 is applied to four flip-flops 221, 222, 223, and 213, respectively, to reset or clear those devices to a low or 0 level. The application of the PRF pulse is regarded as the beginning of a test cycle. The PRF circuit 173 also controls the receiver logic circuit 172 to accept echo pulses only during the window width period.

The one-shot 191 generates a delayed pulse of a predetermined duration for each PRF pulse received thereby. The delayed pulse is applied to the reset input of a flip-flop 227 to cause the 0 output thereof to go high. Also, the delayed pulse is applied to a reset input of a flip-flop 228 to cause the 1 output thereof to assume a low level and the 0 output thereof to assume a high level. The trailing end of the delayed pulse output of the one-shot 191 causes the one-shot 192 to generate a window-width pulse (FIG. 7 (b)).

As mentioned previously, the window-width is the time interval in which the channel 167 will receive valid pulse echoes from the pulses transmitted to the cable 33 from the associated one of the transducers 166—166 and hence avoid stray pulses. The end of the window pulse is regarded as the end of a test cycle. At that time the receiver logic circuit 172 is caused to make a decision as to whether or not to generate a read pulse for further controlling the processing of measurements attributed to receipt of echo signals.

The window pulse transmitted from the output 193 of the one-shot 192 enables the threshold detectors 197 and 201. The threshold detection circuit 202 detects a positive or a negative echo pulse return signal as applied by the wide-band amplifier 190. It should be observed from FIG. 6 that only when the window signal appears on the output 193 of one-shot 192 are the threshold detectors 197 and 201 enabled.

The threshold amplitude detector 201 applies a negative assertion signal to one input of NOR gate 208 in response to the application of a valid positive echo pulse to the input 206. Similarly, the threshold detector 197 applies a negative assertion signal to the other input of the NOR gate 208 in response to a valid negative echo pulse at the input 207. The threshold detection circuit 202 is designed to apply a signal to the NOR gate 208 only when the first echo pulse, which may be positive or negative, has a predetermined minimum amplitude which is set into the level detectors 197 and 201 as a reference level.

As the polyethylene jacket 31 cools, the amplitude of a pulse echo from the jacket increases. The present system measures jacket thickness and eccentricity as close to the extruder as possible. Hence, the measurement herein will be that of hot polyethylene material.

Additionally, the receiver logic circuit 172 tests the first echo pulse to determine if the first echo pulse is less than a predetermined duration. Experiments have shown that the first pulse to be expected from the interface of the water and the outwardly facing surface of the polyethylene is of a very short duration, e.g., approximately 0.5 microseconds. Contrasted to this, the second pulse echo from the interface of the inwardly facing surface of the polyethylene and the core or the shielding layer is of a duration between one and two microseconds. This is due to the polyethylene tending to filter out high frequency energy and the greater reflection at the second interface. Hence, any signals to be valid must meet criteria established with respect to both time duration and amplitude.

Should the amplitude of the first echo pulse exceed a predetermined value, one of the threshold detectors 197 or 201 applies a signal to one input of the NOR gate 208, causing the output thereof to go high. The positive or high voltage level signal from NOR gate 208 is inverted by an inverter 231, which applies a negative signal to the "set" input of flip-flop 221. This sets the 1 output of the flip-flop 221 high. The flip-flop 221 is cleared only upon the application of the PRF signal thereto at the beginning of a subsequent measuring cycle.

The high voltage level of the 1 output of flip-flop 221 is applied to one input of a NAND gate 232. As is seen in FIG. 6, the delayed PRF pulse applied to the flip-flop 228 at the beginning of each cycle of operation resets the 0 output to a high level thus causing a positive true to appear at the other input of the NAND gate 232. This causes an output 233 of the NAND gate 232 to go low, signifies the beginning of the measurement cycle and causes the counter 174 to begin counting.

The appearance of a high level at the 1 output of flip-flop 221 indicates at least a partially valid first echo. A check is initiated to verify this assumption by determining that the duration thereof is approximately 500 nanoseconds and that a time interval or gap occurs thereafter when no signal is present. To this end, the high level output of flip-flop 221 is applied to the input of a first hold-off pulse generating one-shot 236.

The first hold-off one-shot 236 generates a time delay or hold-off pulse to determine if the first pulse is of valid time duration, e.g., 0.5 microseconds to quality as a valid first echo pulse. Thus the first hold-off one-shot 236 is designed to generate a hold-off pulse (FIG. 7 (d)) having a time length of approximately 0.5 microseconds. After the 0.5 microseconds, the trailing edge of the hold-off pulse causes a validation pulse one-shot 237 to generate a pulse (FIG. 7 (e)) of approximately 500 nanoseconds.

During this time, the first validation pulse causes a high enabling level to appear at an input 238 of a NAND gate 241. Should the echo pulse have a threshold amplitude for a duration exceeding the hold-off pulse, a high level is applied to the other input of the NAND gate 241 by the NOR gate 208. This causes an assertion of both positive true inputs of the NAND gate 241 and causes a low level to appear at the output thereof.

If the echo pulse is still present, which would indicate that a valid first echo has not been received because of excessive time duration, the measurement of signal is discarded.

The 0 output of flip-flop 227 is reset by the delayed PRF pulse from the one-shot 191. If the NAND gate 241 is operated to generate a low level at its output, indicative of an echo pulse longer than 500 nanoseconds, the flip-flop 227 is set by the output of NAND gate 241 to cause a change of state at the 0 output of flip-flop 227 from low to high. The low level at the output of flip-flop 227 appears at a D input of the flip-flop 222.

If the D input of the flip-flop 222 is low, the positive trailing edge of the validation pulse generated by the first validation one-shot 237 appears at the C input thereof, generating a low at the 1 output thereof. This corresponds to a "no gap" situation, i.e., the first echo pulse is not a valid one. The next PRF pulse tends to reset the flip-flop 222. However, since the flip-flop output is already low, the output remains low.

If the echo pulse has disappeared after the first hold-off pulse (which indicates a valid first echo pulse), a high does not appear at the input of the NAND gate 241 from the NOR gate 208. Consequently, the NAND gate 241 does not set the flip-flop 227 and the high at the output thereof appears at the D input of the flip-flop 222. If the D input is high when the low-going trailing edge of the first validation pulse from one-shot 237 appears at the C input, an enabling high appears at one input of a NAND gate 242. The output of flip-flop 222 remains high until the next cycle of operation when the PRF pulse resets the flip-flop 222 and causes the output to go low.

Should a high occur at the output of the flip-flop 222, the circuit 172 has in effect validated the first echo pulse as to both amplitude and duration. This conditions the circuit 172 for the second echo pulse (FIG. 7 (c)).

A high appearing at the output of flip-flop 227, enables a NAND gate 243. If the associated second echo pulse received is validated as to duration and threshold amplitude, the NAND gate 243 facilitates the generation of a read pulse to cause the count in the counter 174 to be retained. Thus the generation of a read pulse by the circuit 172 indicates the receipt by the test set 43 of valid echo pulses from the jacket 31 at one of the four principle points therearound (i.e., top, bottom, left or right).

When the second echo pulse is received at the comparator 202, one of the threshold detectors 197 or 201 functions as described hereinbefore to cause the NOR gate 208 to generate a high at the output thereof. This high appears at the other input of the already enabled NAND gate 242 to generate a low at the output thereof, setting the flip-flop 228.

This conditions the receiver logic circuit 172 for validation of the second echo pulse. The setting of the flip-flop 228 causes a low at the 0 output thereof and hence a low at the input of the NAND gate 232 to disable the NAND gate 232 causing the output thereof to go high. This causes a discontinuance of the count of the oscillator 176 output by the counter 174, thus ending the counting cycle.

The remainder of the cycle is devoted to determining the validity of the second echo which would cause the count to be transferred to a buffer in the counter 174. A validation process is used for the second echo pulse similar to that used to validate the first echo pulse. It will be remembered that the second echo pulse will have a duration of up to two microseconds. Hence, the portion of the receiver logic circuit 172 which examines the second pulse is constructed with a built-in delay of one microsecond. Only then is the pulse examined, and if there is yet threshold amplitude, the pulse is valid.

The setting of the flip-flop 228 causes the low at the 1 output thereof to go high, causing a second hold-off pulse generating one-shot 246 to generate a second hold-off pulse having a duration of approximately one microsecond.

When the hold-off delay pulse is generated by the one-shot 246, it is fed back along a line 247 to enable the amplitude comparator 212. The positive amplitude of the second pulse is checked by the amplitude comparator 212 to determine if the amplitude of the second echo exceeds a preset value which is much greater than that of the initial threshold values set into the detectors 197 and 206. The amplitude comparator 212, as shown in FIG. 6, checks only positive signals.

In the event that the maximum amplitude is exceeded, the comparator 212 output goes low to set the flip-flop 213, causing a high level to appear at the 1 output thereof. The high level at the 1 output of the flip-flop 213 is applied along a line 248 to a first enabling input of a read pulse generating one-shot 251.

The trailing edge of the second hold-off pulse generated by the one-shot 246 appears at the input of a second validation pulse generating one-shot 252 which generates a second validation pulse having a pulse width of approximately 400 nanoseconds. The second validation pulse from one-shot 252 is applied to one input of a NAND gate 253.

If either the positive or negative threshold is exceeded during the duration of the validation pulse, the high output of NOR gate 208 is applied to the NAND gates 242 and 253. If this occurs when the second validation pulse is applied to NAND gate 253, indicating the second pulse echo is present, a low level appears at the output of NAND gate 253 to set the flip-flop 223. The setting of the flip-flop 223 causes a high level to appear at the 1 output thereof and at the other input of the NAND gate 243 which had been enabled previously.

The NAND gate 243 is operated to apply a low to a second enabling input of the read pulse one-shot 251, which was enabled previously by the amplitude validation.

The low level pulse applied by the NAND gate 243 to the one-shot 251 indicates that the first pulse was less than one microsecond in duration with an appropriate gap to the second echo pulse and the second echo pulse was of ½–2 microseconds in duration.

Upon cessation of the window pulse, a decision is made as to whether or not to generate the read pulse. The cessation of the window pulse is indicated by a signal applied by the one-shot 192 to the one-shot 251. The one-shot 251, previously enabled by the output of the flip-flop 213 and the NAND gate 243, is now operated to instruct the counter 174 to record the pulse width from the NAND gate 232 at the end of the window pulse.

The oscillator 176 (FIG. 5) generates pulses (FIG. 7 (j)) which are counted by the counter 174 beginning at the initiation of the first hold-off pulse and ending at the initiation of the second echo pulse, with the differences therebetween being a measure of the time interval 2t between the pulse echoes (FIG. 7 (i)). The counter 174 may include three decade counters, each with a 4-bit memory associated therewith. If appropriate validation pulses are generated with respect to associated echo pulse pairs in a positive-negative sequence, then a read pulse is generated by the one-shot 251 at the conclusion of the window-pulse. This causes the count stored in the register of the counter 174 to be transferred to the counter memory. The count from the memory is applied to the digital-to-analog converter 177 which provides a continuous voltage output indicative of the jacket thickness.

The previous count stored in the buffer is not updated until the next subsequent valid read pulse is generated to transfer the associated count to the buffer. Thus, a count remains stored in the buffer until the next valid count is received.

In addition, the digital-to-analog converter 177 includes an indicating lamp 256 (FIG. 5) which is driven for approximately eight hundred microseconds between successive ones of the read pulses. A total of four lamps, one for each channel, are associated with the test apparatus 43 (FIG. 4). If acceptable measurements are being made, the lamps 256—256 will be on approximately 80 to 90 percent of the time. On the other hand, if the signal is lost there will be no light at all which may be indicative of an out-of-position crystal 166 or a defective channel 167. The lamp 256 for each of the channels 167—167 may be used as a warning light to the operator should the system fail and also during the set-up of the apparatus. A lamp 256 is on continuously if a continuous stream of read pulses are generated. When a cable oscillates through the field of view of a particular crystal, the lamp will tend to flicker as no excitation will be present when a crystal cannot "see" the cable.

GENERAL DESCRIPTION OF THE CONTROL SYSTEM

Figure 8:
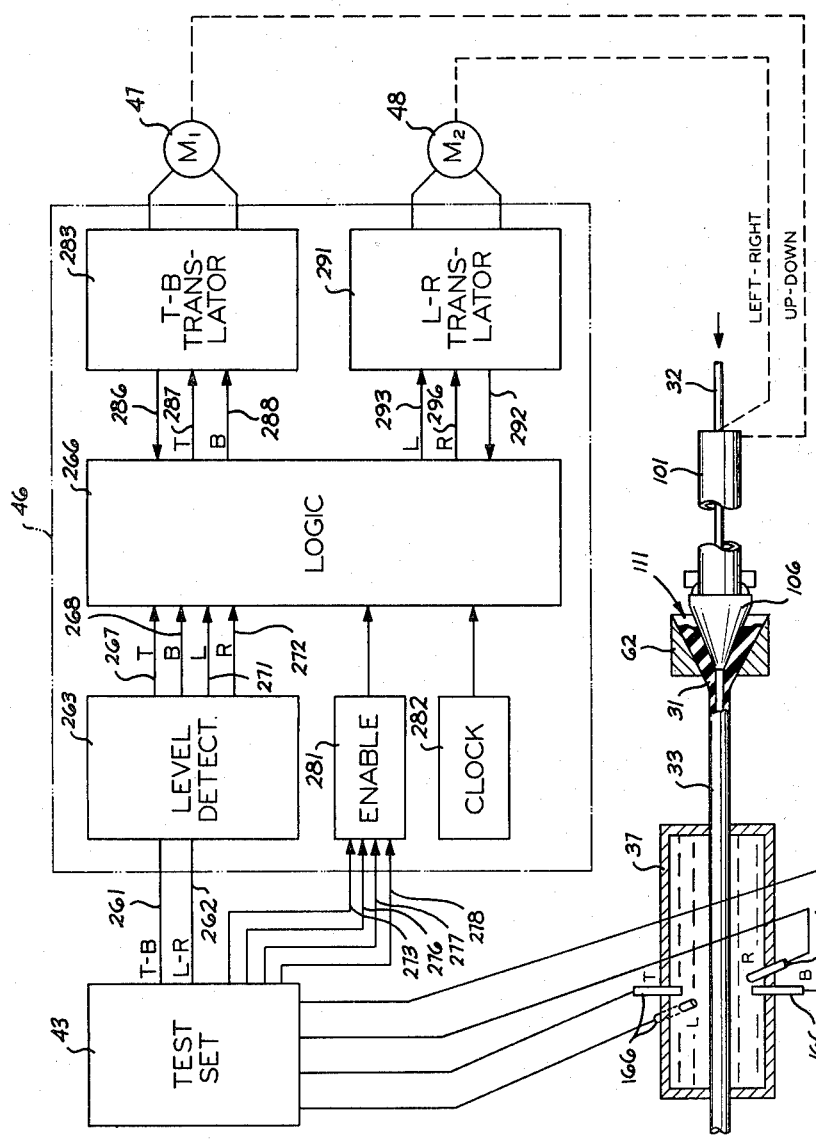
FIG. 8 is a block schematic diagram of the extrusion control system of FIG. 1 for controlling the stepping motors of FIGS. 2 and 3.

Referring to FIG. 8, eccentricity outputs in the form of continuous polarized analog voltages from the eccentricity circuit 181 (FIG. 5) of the test set 43 appear on output lines 261 and 262. These analog voltages are fed to a level detector 263 which separates each eccentricity signal according to its polarity and determines whether or not the magnitude of the eccentricity exceeds a predetermined tolerable level above which a core tube adjustment must be made to correct the eccentricity. This information is fed as a binary quantity to a logic circuit 266 over outputs 267, 268, 271, and 272.

Four read pulse outputs from the one-shots 251—251 of the channels 167—167 are fed on separate lines 273, 276, 277 and 278 to an enable circuit 281 coupled to the logic circuit 266. Synchronizing pulses from a clock circuit 282 are also coupled to the logic circuit 266. In the absence of a read pulse, the clock signal is suppressed, being bypassed to ground through the enable circuit 281. A top-bottom translator 283 associated with the stepping motor 47 delivers the output of an internal oscillator over a line 286 to the logic circuit 266, which gates the output on line 286 selectively to one of two output lines 287 or 288.

The outputs 287 and 288 of the logic circuit 266 are coupled to a motor drive circuit in the translator 283 selectively to drive the stepping motor 47 in first or second directions to drive the slide 118 and the slide 117 vertically up or down pivotally to adjust the core tube 106 within the die 62 to correct a measured eccentricity at the bottom or top, respectively, along the top-bottom axis.

A left-right translator 291 delivers an output oscillator signal over a line 292. The logic circuit 266 gates the output of line 292 to one of two outputs 293 or 296, coupled to a motor control circuit within the translator 291, selectively to drive the motor 48 in first or second directions to drive the slide 177 horizontally left or right, pivotally to adjust the core tube 106 to correct a measured eccentricity to the right or left, respectively, along the left-right axis. As will be seen from the description below, switching means may be provided to permit the operator to control the positioning of the core tube using an observed test set output or a visual indicator, i.e., permit a manual adjustment by the simple actuation of a lever switching means.

AUTOMATIC CONTROL CIRCUIT

Figure 10:
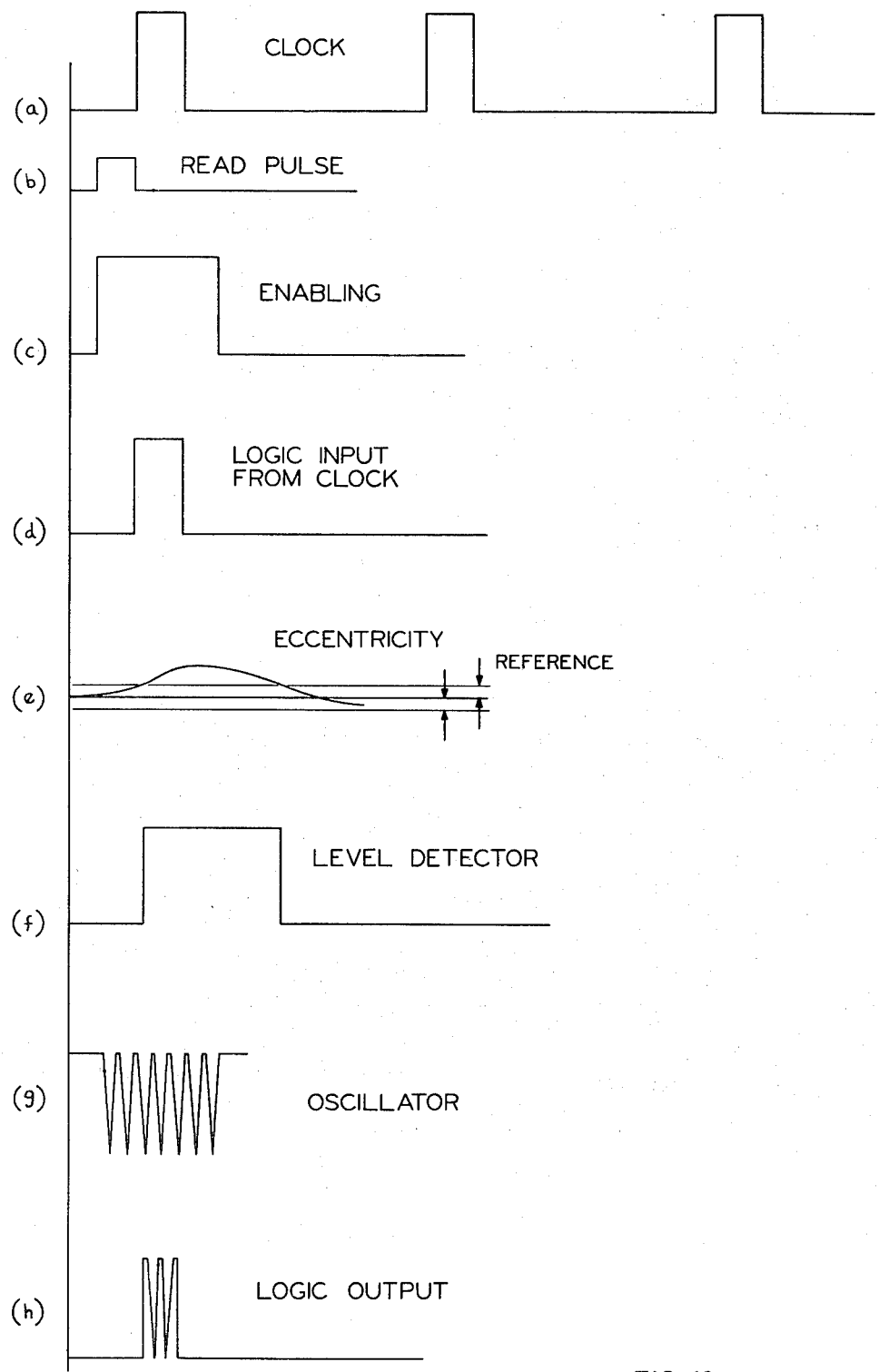
FIG. 10 illustrates various waveforms associated with the schematic diagram of FIG. 9.

The clock 282 utilizes an R-C network to drive an operational amplifier having no feedback and a unijunction transistor to produce positive pulses having a period of up to ten seconds and a pulse width of up to nine seconds and having an amplitude of approximately 15 volts. A 6 second period and a one second pulse width were found to produce the most satisfactory results on the larger cable sizes. A typical output waveform from the clock 282 is shown in FIG. 10 (a).

Figure 9:
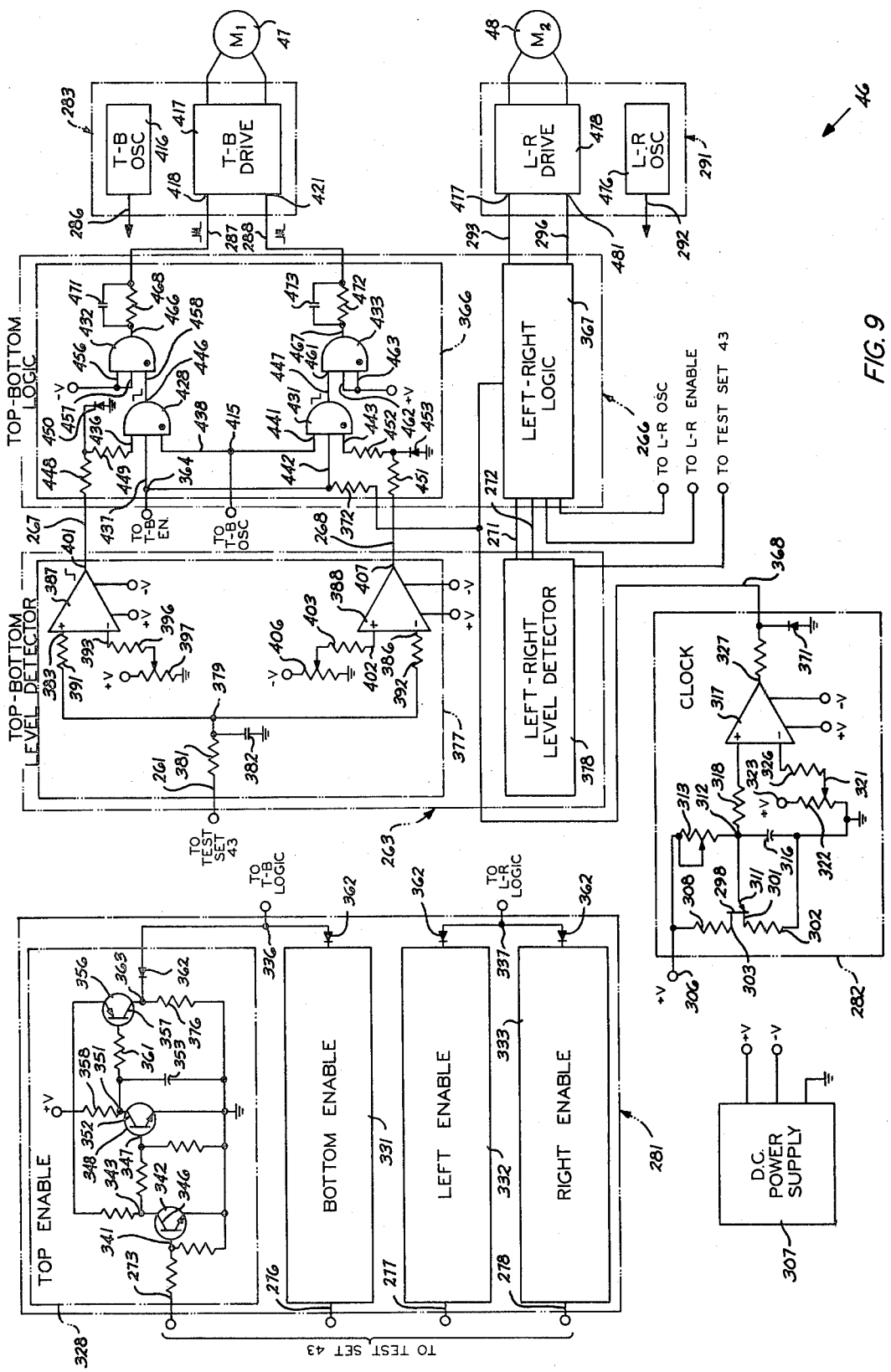
FIG. 9 is a detailed schematic diagram of the system of FIG. 8.

Referring to FIG. 9, the clock 282 includes a unijunction transistor (UJT) 298 having its base number one 301 connected to ground through a resistor 302 and its base number two 303 connected to a terminal 306 coupled to the positive side of a 15 volt DC power supply 307 through a resistor 308, which may be equal in value to the resistor 302. An emitter 311 of the UJT 298 is connected to a junction point 312 which is connected to the terminal 306 through a potentiometer 313, to ground through a capacitor 316 and to the positive or non-inverting input of an operational amplifier 317 through an input resistor 318. The negative or inverting input of the amplifier 317 is connected to a tap 321 of a potentiometer 322, connected between a positive supply terminal 323 and ground, through an input resistor 326. The output 327 of the amplifier 317 is normally held at a small negative potential, for example, −0.6 volts.

With the UJT 298 initially non-conducting or "off", the positive supply current delivered to terminal 306 charges the capacitor 316 through the potentiometer 313, with some of the supply current being fed to the non-inverting input of the amplifier 317 through the resistor 318. As the capacitor 316 charges, the potential at junction point 312 rises until the d.c. voltage level at the non-inverting input of the amplifier 317 exceeds the reference voltage level, established at the inverting input of the amplifier 317. At that time, the output 327 of the amplifier 317 swings positive to a level approximately equal to the supply voltage. The amplifier output 327 stays at this level until the rising voltage at point 312 attains a level sufficient to fire the UJT 298, providing a discharge path to ground for the capacitor 316 through the emitter 311 and the base number one 301 of the UJT 298 and the resistor 302. The discharge of the capacitor 316 causes the voltage at the non-inverting input of the amplifier 317 to fall below the level established at the inverting input thereof, swinging the output 327 negative. After the capacitor 316 discharges the UJT 298 is returned to its original "off" condition. The capacitor 316 then begins to recharge to repeat the clock cycle.

The enable circuit 281 receives the outputs from the four read pulse generating one shots 251—251 (FIG. 6) of the ultrasonic test set 43, which verify that good data is being received by the transducers 166—166. The enable circuit 281 includes four stages 328, 331, 332, and 333 which receive top, bottom, left and right read pulses from outputs 273, 276, 277 and 278, respectively, of test set 43. The outputs of stages 328 and 331 are tied together at a junction point 336, while the outputs of stages 332 and 333 are tied together at a junction point 337. Each stage of the enable circuit 281 has two functions, amplification and pulse stretching. The amplification portion of each stage boosts the input pulse level of a received read pulse to approximately the positive DC supply voltage (15 volts). The pulse stretching portion of each stage lengthens or stretches the time duration of a received read pulse from approximately 0.8 ms. to approximately 2 to 3 seconds. The pulse lengthening is required since, as explained above, the test set 43 may not deliver an output read pulse each time a transducer 166 is excited and it must be assumed that some read pulses will not be available for the control system 46.

Since the read pulses from the test set 43 are identical, having amplitudes of approximately 5 volts and pulse widths of approximately 0.8 ms., the stages 328, 331, 332 and 333 of the enable circuit 281 are identical. For this reason, only stage 328 will be described in detail, it being understood that the stages 331, 332, and 333 operate in an identical manner.

A read pulse from the ultrasonic test set 43 associated with the uppermost vertically arranged transducer 166 (the "top" thickness sensor) appears at the output 273 of the test set 43 and is fed to the input of the enable stage 328 to the base 341 of a first transistor 342 where it is amplified, the amplitude signal appearing at a junction point 343 coupled to a collector 346 of the transistor 342. The amplified signal is then coupled to a base 347 of a second transistor 348. The signal is further amplified by the transistor 348 and appears at a junction point 351, coupled to a collector 352 thereof, causing the voltage thereat to drop, discharging a capacitor 353 to forward bias a normally non-conducting switching transistor 356, causing the voltage appearing at a collector 357 thereof to rise. At the termination of the read pulse, the capacitor 353 charges for a time dependent upon the value of capacitor 353 and the parallel combination of a biasing resistor 358 and an input resistor 361 associated with the switching transistor

356.

The charge time of the capacitor 353 determines the amount of stretching of the amplified input read pulse. The switching transistor 356 remains in a conductive state until the capacitor 353 has charged sufficiently to permit the base-to-emitter junction of the transistor 356 to become reverse biased. The stretched pulse appearing at the collector 357 of transistor 356 reverse biases a diode 362 coupled thereto at a junction point 363 for the duration of the stretched pulse. Each stage of the enable circuit 281 thus far will be seen to render an amplified and stretched output pulse whenever it receives a read pulse from the test set 43.

The junction point 336 at the outputs of the top and bottom enable stages 328 and 331, respectively, of the enable circuit 281 is connected to a junction point 364 in a top-bottom stage 366 of the logic circuit 266, which includes an identical left-right stage 367. The junction point 337 at the outputs of the left and right stages 332 and 333, respectively, of the enable circuit 281 is similarly connected to a junction point (not shown) in the left-right stage 367 of the logic circuit 266.

The clock pulse output from the clock 282 appearing on an output line 368 thereof and held above ground by a diode 371, which is reverse biased whenever the clock output goes high, is coupled to the junction point 364 in the top-bottom stage 366 of the logic circuit 266 through a resistor 372. Since the junction point 364 is at the same potential as the junctin point 336 at the outputs of the enable stages 328 and 331, the output of the clock 282 also appears at the junction point 336 where it tends to forward bias the diodes 362-362 whenever the clock output goes high. Similarly, the clock output appears at the junction point 337 at the outputs of the enable stages 332 and 333 through the left-right stage 367 of the logic circuit 266.

It will be apparent that the absence of a read pulse input to any of the enable stages 328, 331, 332, and 333 results in no reverse biasing of an associated output diode 362 by a stretched read pulse. Thus the clock signal appearing at the junction points 336 and 337, and tending to forward bias the diodes 362-362 is provided with a low resistance path to ground through a forward biased diode 362 and a collector resistor 376 associated with a non-conducting enable stage transistor 356. Thus, the clock output is forced to go low and does not appear as a high at junction point 364.

The level detector 263 includes two identical stages 377 and 378 which receive the top-bottom and left-right polarized analog eccentricity signals, respectively, from the outputs 261 and 262 of the ultrasonic test set 43 continuously to monitor the voltage levels thereof.

The outputs 261 and 262 of the ultrasonic test set 43 supply analog voltages ranging between ± 5 v.d.c. which indicate the percent eccentricity of the jacket 31 along the vertical and horizontal coordinate axes. A positive or negative voltage on output 261 indicates an eccentricity at the top or bottom, respectively, along the top-bottom diametric axis, the degree thereof being indicated by the magnitude of the d.c. analog voltage.

The d.c. voltage appearing on output 262 of the test set 43 provides similar information with respect to the leftright diametric axis through the cable 33, with positive and negative voltages indicating left and right eccentricities, respectively, of the cable jacket 31.

Since both stages 377 and 378 of the level detector 263 are identical, only stage 377 will be described in detail, it being understood that stage 378 operates in the same manner.

The top-bottom eccentricity signal (FIG. 10 (e)) from output 261 of the test set 43 is fed to a junction point 379 of stage 377 of the level detector 263. The eccentricity signal is an analog d.c. quantity representative of the degree of eccentricity of the jacket 31 along the vertical axis through the cable 33, defined by the diametrically opposed transducers 166-166 at the top and bottom thereof, a positive voltage being indicative of left eccentricity and negative voltage being indicative of right eccentricity.

The eccentricity signal passes through an RC filter which includes a resistor 381 and a capacitor 382, and is fed simultaneously to a non-inverting input 383 and an inverting input 386 of a pair of similar operational amplifiers 387 and 388 through input resistors 391 and 392, respectively. An inverting input 393 of the amplifier 387 has a threshold or reference voltage applied thereto through a resistor 396 and a potentiometer 397, connected between the positive supply terminal of power supply 307 and ground. The purpose of the dual operational amplifiers 387 and 388 is to yield a positive output of one of the amplifiers when a positive eccentricity signal exists and a positive output at the other amplifier when a negative eccentricity signal exists. Both the amplifiers 387 and 388 are connected without feedback elements and therefor operate similar to the amplifier 317 of the clock circuit 282, that is, amplifiers 387 and 388 are utilized as switches being on or off depending upon the level of the applied analog eccentricity signal.

A positive eccentricity signal applied to the junction point 379 causes a normally low output 401 of amplifier 387 to go high when the magnitude of the positive eccentricity signal exceeds the magnitude of the positive reference voltage appearing at the input 393 thereof. Similarly, a negative eccentricity signal applied to the junction point 379 can not exceed the positive reference voltage appearing at input 393 of the amplifier 387 and no change in the output 401 occurs.

Correspondingly, a positive eccentricity signal applied to the junction 379 can not exceed, in the negative direction, a negative reference voltage set on an input 402 of the amplifier 388 connected to the negative terminal of power supply 307 through a resistor 403 and a potentiometer 406 and therefor has no effect on a normally low output 407 thereof. Similarly, a negative eccentricity signal applied to the junction point 379 causes output 407 of amplifier 388 to go high when the magnitude of the negative signal appearing at the reversing input 386 exceeds the negative reference voltage appearing at input 402.

From the foregoing, it can be seen that a positive top-bottom eccentricity signal, indicating that the jacket thickness at the top of the jacket 31 exceeds the thickness at the bottom thereof, causes output 401 of amplifier 387 to go high, generating a high on output line 267, while a negative top-bottom eccentricity signal, indicating that the jacket thickness at the bottom of the jacket 31 exceeds the thickness at the top thereof, causes the output 407 of the amplifier 388 to go high, generating a high on line 268.

The reference voltages or "dead bands" adjustably set on either side of zero by the potentiometers 397 and 406 permit the top-bottom eccentricity signal to vary between predetermined positive and negative limits without causing the outputs of the amplifier 387 and 388 to swing positive. It has been found that utilizing a voltage setting of plus or minus 0.75 volts, eccentricity may be controlled to within plus or minus 3 mils on the larger cable sizes, namely, cables having diameters exceeding 2 inches.

Stage 378 of the level detector 263 operates identically to stage 377 with respect to the left-right eccentricity signal appearing on the output 262 of the test set 43. Positive eccentricity signals, indicating that the jacket thickness on the left side of jacket 31 exceeds the thickness of the right side thereof, extending a predetermined reference voltage level, cause the output 271 thereof to go high. Similarly, negative eccentricity signals, indicating that the jacket thickness on the right side of jacket 31 exceeds the thickness on the left side thereof, exceeding another predetermined reference voltage level, cause the output 272 thereof to go high.

As shown in FIG. 9, the top-bottom translator 283 includes a motor driving oscillator 416, the output 286 of which is coupled to a junction point 415 in the top-bottom stage 366 of the logic circuit 266. The oscillator 416 is the source of driving energy for the stepping motor 47. A motor drive circuit 417 in the translator 283 includes a pair of inputs 418 and 421 for selectively receiving the output of oscillator 416 after it has been gated through the top-bottom stage 366 of the logic circuit 266 onto one of the outputs 287 or 288. Since the stages 366 and 367 of the logic circuit 266 are identical, only the stage 366 will be described in detail, it being understood that stage 367 operates in the same manner.

The logic circuit 366 receives signals from the clock circuit 282 subject to the operation of the enable circuit 281 and the level detector 263 selectively to gate oscillator signals from the translators 283 and 291 to the stepping motor drive circuits to drive the stepping motors 47 and 48 to adjust the core tube 106 within the die 62 to vary the extrusion orifice 111 to correct eccentricities in the jacket 31 detected by the test set 43.

The oscillator 416 generates a periodic waveform, shown in FIG. 10 (g) which rides at a positive 10 volt level with negative-going spikes to zero. The pulse rate may be adjustable between four and two hundred pulses per second.

As previously mentioned, the clock 282 is on for one second and off for five seconds. The time delay between pulses permits the cable 33 to be advanced from the cross head 36 of the extruder 34 to the sensing means 42 in the cooling trough 37. Also, as previously mentioned, the absence of a read pulse to any of stages 328, 331, 332, and 333 of the enabling circuit 273 may cause the clock output to go low such that the clock 282 is effectively turned off if one of the associated axially aligned transducers 166–166 are not receiving "good" information.

The logic stage 366 includes four NAND gates 428, 431, 432 and 433. NAND gates 428 and 431 are provided each with three inputs 436, 437, 438, and 441, 442, 443, respectively, and outputs 446 and 447, respectively.

The NAND gates 428, 431, 432 and 433 are characterized in that high or binary 1 voltage level simultaneously occurring at the three inputs thereof cause the normally high output thereof to go low for the time the coincidence of the signals at the inputs exists.

Input 436 of NAND gate 428 is coupled to the "top" output 401 of the top-bottom level detector 377 through out-put line 267 and serially arranged resistors 448 and 449. A diode 450, connected at the junction of the resistors 448 and 449 and ground, is reversed biased by a high appearing on the output 401 to maintain the junction above ground. Similarly, the input 443 of NAND gate 431 is coupled to the "bottom" output 407 of the top-bottom level detector 377 through output line 268 and serially arranged resistors 451 and 452 having a diode 453 connected at the junction thereof and ground.

Inputs 437 and 442 of the NAND gates 428 and 431, respectively, are coupled to the junction point 364 fed by the clock pulse output 368 of the clock 282. The remaining inputs 438 and 441 of the NAND gates 428 and 431, respectively, are coupled to the output 286 of the driving oscillator 416 of the translator 283 at the junction point 415.

NAND gates 432 and 433 are provided each with three inputs 456, 457, 458, and 461, 462, 463, respectively. Inputs 456 and 457 of NAND gate 432 and inputs 462 and 463 of NAND gate 433 are connected to the positive terminal of the d.c. supply 307. The normally high outputs 446 and 447 of NAND gates 428 and 431, respectively, are coupled to the inputs 458 and 461 of the NAND gates 432 and 433, respectively. Thus, an output 466 of the NAND gate 432 and an output 457 of the NAND gate 433 are normally low, since all of the NAND gates in the logic detector 266 operate identically. A low on output 446 of NAND gate 428 forces output 466 of NAND gate 432 high and vice versa. Similarly, a low on output 447 of NAND gate 431 forces output 467 of NAND gate 433 high and vice versa. From this, it is seen that NAND gates 432 and 433 function as inverters, each changing state when the state of its input is changed.

Assuming the presence of enabling pulses back biasing the diodes 362—362 of the top and bottom stages 328 and 331 of the enable circuit 281, a clock pulse applied to the junction point 364 of stage 366 of the logic circuit 266 results in a positive clock pulse appearing on input 437 of NAND gate 428 and input 442 of NAND gate 431. At this time, if one of the outputs 401 or 407 of the top-bottom level detector 377 is delivering a high voltage level to input 436 of NAND gate 428 or input 443 of NAND gate 431, one of the NAND gates 428 or 431 is enabled for the duration of the applied clock pulse. Since inputs 438 of NAND gate 428 and 441 of NAND gate 431 are continuously receiving the pulsed output of oscillator 416, output 446 of NAND gate 428 or output 447 of NAND gate 431 will be driven high periodically at the oscillator pulse rate.

Thus a signal on output 261 of the test set 43, if positive, and above the reference level established at input 393 of the amplifier 387 will result in the simultaneous occurrence of three high voltage levels at the oscillator pulse rate synchronized by the clock pulses at the inputs of the NAND gate 428, causing the normally high output 446 thereof to go low at the oscillator pulse rate. This output is inverted by the NAND gate 432 to generate a square wave envelope at the oscillator pulse rate at the input 466 thereof. An RC network including the parallel combination of a resistor 468 and a capacitor 471 sharpens the fall time of the output pulses generated at output 466 of the NAND gate 432. The pulsed output (FIG. 10 (h)) appears on line 287 coupled to input 418 of the motor drive circuit 417 in the translator 283 to drive the stepping motor 47 in a first direction, rotating shaft 147 (FIG. 3) thereof to move slide 118 downward an incremental distance to raise the end of the core tube 106 upward an incremental distance to compensate for the measured eccentricity at the top of the top-bottom axis.

Correspondingly, a negative eccentricity signal appearing on the output 261 of test set 43 and exceeding the allowable level preset into amplifier 388 of the stage 377 of the level detector 263 gates the output 286 of oscillator 416 through the NAND gates 431 and 433. The pulses appearing at the output 467 of NAND gate 433 are coupled to output 288 through a pulse shaping RC network including a resistor 472 and a capacitor 473. The sharpened pulses appearing on "bottom" output 288 of the top-bottom logic stage 366 are coupled to input 421 of motor drive circuit 417 in the translator 283 to drive the stepping motor 47 in a second direction, rotating shaft 147 thereof to move the slide 118 upward an incremental distance to lower the end of the core tube 106 to compensate for the measured eccentricity at the bottom of the top-bottom axis.

The correcting adjustments will continue at the clock pulse rate until the eccentricity signal on line 261 of test set 43 falls below the threshold or reference level of the level detector 263.

The left-right logic stage 367 and the left-right translator 291 operate identically to the top-bottom logic stage 366 and the top-bottom translator 283. Positive eccentricity signals appearing on the output 262 of test set 43 exceeding the reference level preset into the left-right level detector stage 377 cause the logic stage 367 to gate the signal on output 292 from an oscillator 476 in translator 291 to output 293 of logic stage 367, which is coupled to an input 477 of a motor drive circuit 478 coupled to the stepping motor 48. This causes the stepping motor shaft 131 (FIG. 2) to rotate in a first direction to impart incremental rightward movement to the slide 117 to pivot the end of core tube 106 to the left to compensate for the measured left eccentricity.

Correspondingly, negative eccentricity signals appearing on the output 262 of test set 43 exceeding the reference level preset into the left-right level detector stage 378 cause the logic stage 367 to gate the signal on output 292 from oscillator 476 in translator 291 to output 296 of logic stage 367, which is coupled to an input 481 of the motor drive circuit 478 coupled to the stepping motor 48. This causes the stepping motor shaft 131 to rotate in a second opposite direction to impart incremental leftward movement to the slide 117 to pivot the end of core tube 106 to the right to compensate for the measured right eccentricity.

Once again the correcting adjustments continue at the clock pulse rate until the eccentricity signal on output 262 of test set 43 fails below the allowable level present into the level detector 266.

The movement of the slides 117 and 118 may be superimposed, e.g., both stepping motors 47 and 48 may be driven simultaneously such that the slide 117 has both horizontal and vertical velocity components to impart to the end of core tube 106 opposite and proportional components of velocity. This can occur since eccentricities can exist simultaneously along both the top-bottom and the left-right axes. As can be seen from FIGS. 2 and 3, the slide 117 is mounted for horizontal movement within the slide 118, which is mounted for vertical movement. Thus energization of either stepping motor 47 or 48 imparts movement to the slide 117, the latter motor directly and the former through the slide 118.

As previously pointed out, the correcting adjustments are made during each period of the clock 282, as long as the validating read pulses are being received from the test set 43. A large eccentricity may require several adjusting periods to correct, each successive adjustment resulting in a diminished analog eccentricity output from the test set 43 until the measured eccentricity falls below the preset tolerable reference level set into the level detector 263.

Figure 11:
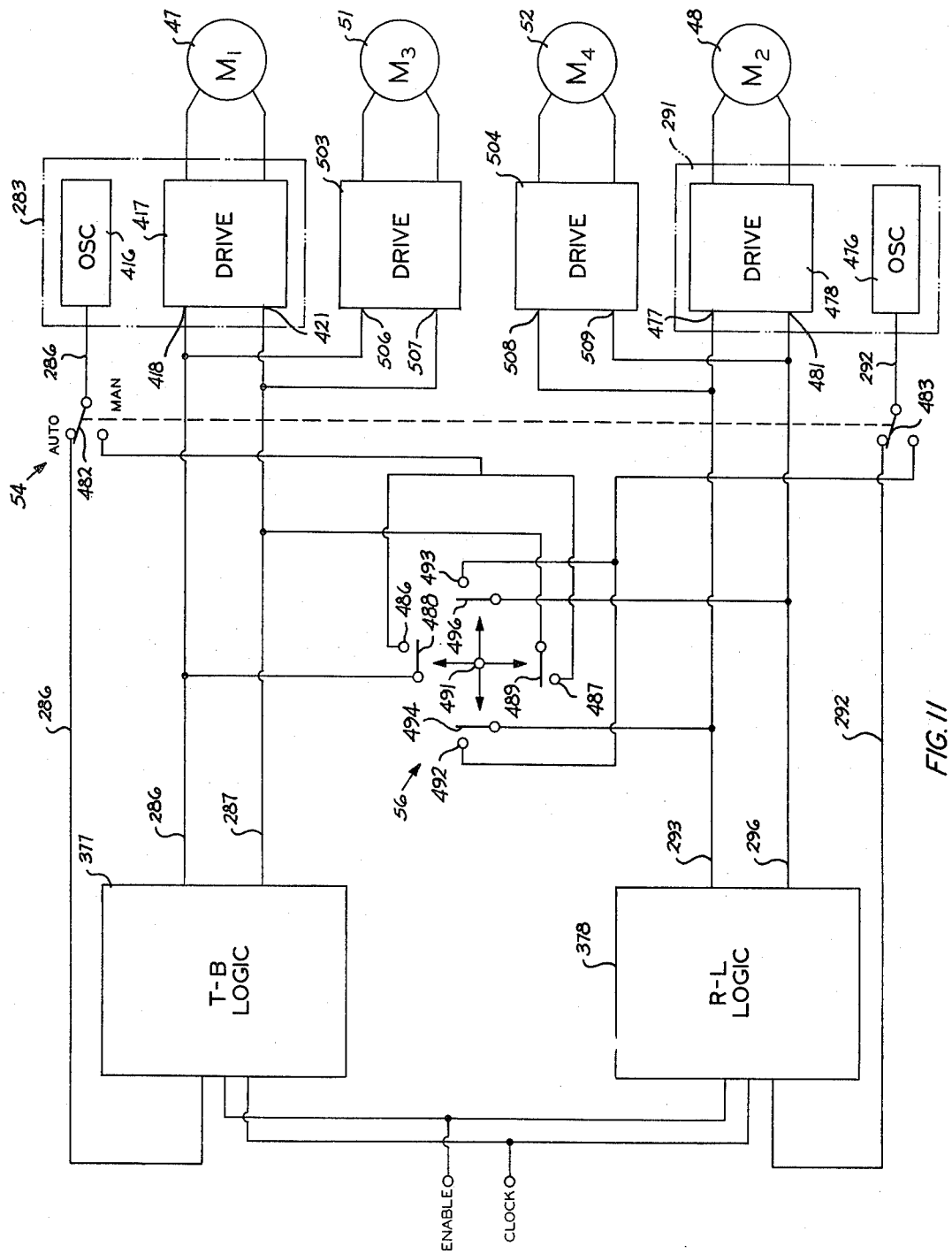
FIG. 11 illustrates a wiring arrangement for providing the control system with a manual control.

Referring to FIG. 11, there is shown a wiring arrangement whereby the control system 46 may be operated manually by an operator while observing the cross-hair display 53. For simplicity, only the logic stages 377 and 378 and the translators 283 and 291 of the previously described system are shown.

The switch 54 of FIG. 1 includes a pair of ganged single-pole-double-throw switches 482 and 483 for switching the oscillator outputs of the translators 283 and 291 from the inputs of the logic stages 377 and 378, respectively, to the multiple-contact lever-operated switch 56, selectively to transfer the output of oscillator 416 in the translator 283 to the inputs 418 or 421 of the drive circuit 417 therein, to control the top-bottom stepping motor 47, or to transfer the output of oscillator 476 in translator 291 to the input 477 or 481 of the drive circuit 478 therein to control the leftright stepping motor 48.

With the switches 482 and 483 in the automatic (AUTO) position the system operates as previously described. With the switches 482 and 483 in the manual (MAN) position, the output 286 of oscillator 416 in translator 283 bypasses the logic stage 377 and is coupled simultaneously to top-bottom switch contacts 486 and 487, respectively, of the switch 56, which is provided with top and bottom spring contacts 488 and 489, respectively, connected to the inputs 418 and 421 of the driving circuit 417 in the translator 283. A lever operating mechanism 491 may be moved resiliently up or down selectively either to urge the spring contact 488 into engagement with the contact 486 or to urge the spring contact 489 into engagement with contact 487 selectively to transfer the signal on the output 286 of oscillator 416 in translator 283 to the input 418 or the input 421, respectively, of drive circuit 417, to drive the top-bottom stepping motor 47 reversibly in first or second directions to compensate for an observed jacket eccentricity at the top or bottom, respectively.

Similarly, with switch 54 in the MAN position, the output 292 of the oscillator 476 in the translator 281 bypasses the logic stage 378 and is coupled to a left contact 492 and a right contact 493 of the switch 56. The lever operating mechanism 491 may be moved resiliently to the left or to the right selectively to urge a spring contact 494 or a spring contact 496 into engagement with the contact 492 or the contact 493, respectively, to couple the oscillator output 292 selectively to the input 477 or 481 of the drive circuit 478 in the translator 291, to drive the left-right stepping motor 48 reversibly in first or second directions, to compensate for an observed eccentricity on the left or right side of the cable jacket.

The lever operating mechanism 491 returns to its home or non-contacting position through a spring mechanism (not shown) whenever it is released.

The cross-hair display 53 (See FIG. 1) may include a pair of superimposed relatively movable panels 497 and 498 being driven rectilinearly in transversely related directions by the stepping motors 51 and 52, respectively. The plate 497 displays a circle 501 representative of the passageway 73 through the die 62 while the plate 498, which may be transparent, displays a cross-hair 502 representing the center of the core tube 106 in the crosshead 36. These may be coupled to the stepping motors 51 and 52, in a manner similar to the manner in which slide 118 is coupled to stepping motor 48, which may be driven through drive circuits 503 and 504 respectively of third and fourth transistors (not shown). The drive circuit 503 may be provided with top and bottom inputs 506 and 507, respectively, connected in parallel to the inputs 418 and 421, respectively, of the drive circuit 417 for the motor 47 to synchronize the movement of the motor 51 with the motor 47.

The drive circuit 504 for the left-right display stepping motor 52 may be provided with left aand right inputs 508 and 509, respectively, connected in parallel to the inputs 477 and 481 of the drive circuit 478 for the stepping motor 48 to synchronize the movement of the motor 52 with the motor 48.

Thus, the control system 46 is capable of both fully automatic and manual operation and may be provided with visual indicating means which, as can be seen in FIG. 11, may operate whether the system is selected to function in an automatic or manual operating mode.

Though the system of the invention has been described utilizing a particular test set, namely, the ultrasonic thickness and eccentricity monitor disclosed in the aforementioned applications of Boggs et al, other measuring means may be utilized. For example, if the cable 33 includes a metallic sheath between the jacket 31 and the core 32, it is possible to use a capacitance-type eccentricity measuring system, for example, the system described in B. M. Wojciechowski U.S. Pat. No. 2,721,975, issued October 25, 1955, which discloses a capacitance monitor which may be utilized to observe cable jacket eccentricities along diametric axes normal to one another, rendering a polarized d.c. signal indicative of the eccentricity.

In utilizing the system described in Wojciechowski, the enable circuit 281 of the control system 46 may be eliminated, since the Wojciechowski system does not provide a validating output similar to the read pulses of the preferred test set. Thus in using such a system, the clock pulses from the clock 282 are never suppressed.

Similarly, the sensors need not be in a fixed position but may be mounted for movement relative to the cable 33, for example, on an indexable head of the type disclosed in W. T. Eppler U.S. Pat. No. 3,500,185, issued Mar. 10, 1970, to engage diametrically opposite wall sections of a jacketed cable.

Other types of jacket monitoring sensors are known, for example, magnetic sensing coils connected into a measuring bridge as disclosed in W. M. Smith U.S. Pat. No. 3,407,352, issued Oct. 22, 1968.

The foregoing measuring systems generally require physical contact between a sensor and the cable jacket hence requiring the hot jacket to be cooled prior to contact with the sensor to avoid furrows being formed therein. The preferred ultrasonic system, on the other hand, is capable of use when the hot cable initially enters the water trough and hence is closer to the extruder head facilitating a faster correction of jacket eccentricities. In using a sensor in physical contact with the jacket 31, a preferred alternative position for a sensing means 42' including a contacting type sensor would be between the cooling trough 37 and the capstan 38 as shown in phantom lines in FIG. 1.

It should be understood that the basic requirement for the successful operation of the control system of the invention is that an analog quantity be available which represents a jacket eccentricity along at least one diametric cross-sectional axis therethrough. Also, when eccentricity measurements are provided along two axes, they need not be coplanar, since longitudinal variations in jacket thickness are generally small. Though a test set providing validity signals is preferred, it is not essential to the operation of the control system 46. Therefore, as previously mentioned, other types of test sets may be utilized to provide jacket eccentricity information.

Thus, though a preferred embodiment of the invention has been described above, it is simply illustrative and other embodiments will become apparent to those having ordinary skill in the art without departing from the spirit and scope of the invention.

What is claimed is:

1. A system for controlling the eccentricity and uniformity of a plastic jacket being extruded onto a longitudinally moving elongated core passing through a hollow core tube positioned within a passageway formed in a die to define an annular extrusion orifice therebetween, which comprises:

means for measuring the eccentricity of the jacket along a diametric cross-sectional axis therethrough;

means for generating a polarized analog signal representative of the direction and magnitude of the eccentricity of the jacket along said axis;

level detecting means responsive to the magnitude and direction of said analog signal for generating a binary signal indicative of the direction of said eccentricity along said axis;

a motor having an output, a first input for driving said output in a first direction and a second input for driving said output in a second direction;

a motor driving oscillator;

gating means responsive to said binary signal for applying signals from said oscillator selectively to drive one of said inputs of said motor to cause said output to be driven in accordance with said binary signal;

universal means pivotally mounting said core tube for angular movement in the die passageway; and means coupling said output of said motor to said core tube for imparting angular movement to said tube in first or second directions in a plane coincident with said measuring axis when said output is driven in said first or second direction, respectively to alter the extrusion orifice to compensate for the measured eccentricity.

2. A system for controlling the eccentricity of an extruded jacket as set forth in claim 17 and including:

means for simultaneously measuring the eccentricity of the jacket along a second diametric cross-sectional axis normal to said first axis;

means for generating a second polarized analog signal representative of the direction and magnitude of the jacket eccentricity along said second axis;

second level detecting means responsive to the magnitude and direction of the jacket eccentricity along said second axis for generating a second binary signal representative of the direction of said eccentricity therealong;

a second motor having an output, a first input for driving said output in a first direction and a second input for driving said output in a second direction;

a second motor driving oscillator;

gating means responsive to said second binary signal for applying signals from said second oscillator selectively to drive one of said inputs of said second motor to cause said output to be driven in accordance with said second binary signal; and means coupling said output of said second motor to said core tube for imparting angular movement to said core tube in first and second directions in a second plane coincident with said second measuring axis when said second motor output is driven in said first or second direction, respectively, for altering said extrusion orifice to compensate for said measured eccentricity along said second axis.

3. A system for controlling the eccentricity of an extruded jacket as set forth in claim 2 and including means mounting said first motor and said coupling means coupling said first motor to the core tube for movement in said second plane when said output of said second motor is driven.

4. An improved apparatus for extruding a tubular article, of the type having an axial extrusion chamber for receiving fluent plastic material, a die coaxially positioned in said chamber, and tube forming means coaxially positioned in said chamber and having a forming surface extending into said die to form an angular extrusion orifice therebetween, wherein the improvement comprises:

bearing means mounting said tube forming means for pivotal movement about a point along the axis of said chamber adjacent to said orifice;

an axial extension on said tube forming means extending along said chamber away from said orifice;

a bracket and a first slide movable in said bracket along a first axis transverse to the axis of said chamber, a second slide movable in said first slide along a second coordinate axis transverse to the axis of said chamber and said first axis;

means coupling said axial extension on said tube forming means to said second slide;

a first stepping motor for imparting reversible rectilinear movement to said first slide;

a second stepping motor for imparting reversible rectilinear movement to said second slide;

first and second motor drive oscillator;

switching means coupling said first and second motor drive oscillators to drive said first and second stepping motors, respectively; and means for selectively actuating said switching means to impart reversible movement to said first and second stepping motors to vary the extrusion orifice between said die and said tube forming means.

5. In an apparatus for extruding a tubular article as set forth in claim 4 and including indicating means for determining the position of said tube forming means respect to said die.

6. In an apparatus for extruding a tubular article as set forth in claim 5 wherein said indicating means includes third and fourth stepping motors in parallel with said first and second stepping motors, respectively, display means representing said die and mounted for rectilinear movement along a first axis by said third stepping motor and display means representing said tube forming means mounted for rectilinear movement along a second axis transverse to said first axis by said fourth stepping motor.

7. A system for controlling the eccentricity and uniformity of a plastic jacket being extruded onto a longitudinally moving elongated core passing through a hollow core tube positioned within a passageway formed in a die to define an annular extrusion orifice therebetween, which comprises:

means for measuring the eccentricity of the jacket along a diametric cross-sectional axis therethrough;

means for generating a polarized analog signal representative of the direction and magnitude of the eccentricity of the jacket along said axis;

level detecting means responsive to the magnitude and direction of said analog signal for generating a binary signal indicative of the direction of said eccentricity along said axis;

drive means having an output, a first input for driving said output in a first direction and a second input for driving said output in a second direction;

means for driving said drive means;

gating means responsive to said binary signal for applying said means for driving said drive means selectively to one of said inputs of said drive means;

universal means pivotally mounting said core tube for angular movement in the die passageway; and means coupling said output of said drive means to said core tube for imparting angular movement to said core tube in first or second directions in a plane coincident with said measuring axis when said output is driven in said first and second direction, respectively to alter the extrusion orifice to compensate for the measured eccentricity.

8. A system for controlling the eccentricity of an extruded jacket as set forth in claim 7 and including:

means for simultaneously measuring the eccentricity of the jacket along a second diametric cross-sectional axis normal to said first axis;

means for generating a second polarized analog signal representative of the direction and magnitude of the jacket eccentricity along said second axis;

second level detecting means responsive to the magnitude and direction of the jacket eccentricity along said second axis for generating a second binary signal representative of the direction of said eccentricity therealong;

second drive means having an output, a first input for driving said output in a first direction and a second input for driving said output in a second direction;

second means for driving said second drive means;

gating means responsive to said second binary signal for applying said second means for driving said second drive means selectively to one of said inputs of said second drive means; and means coupling said output of said second drive means to said core tube for imparting angular movement to said core tube in first and second directions in a second plane coincident with said second measuring axis when said second output is driven in said first or second direction, respectively, for altering said extrusion orifice to compensate for said measured eccentricity along said second axis.

* * * * *

UNITED STATES PATENT AND TRADEMARK OFFICE
Certificate

Patent No. 3,923,439            Patented December 2, 1975

Arthur Merle Isley, Robert Wayne Rake and Albert Sanford Tingley

Application having been made by Arthur Merle Isley, Robert Wayne Rake and Albert Sanford Tingley, the inventors named in the patent above identified, and Wester Electric Co., Inc., New York, N.Y., the assignee, for the issuance of a certificate under the provisions of Title 35, Section 256, of the United States Code, adding the name of George Edwin Mock as a joint inventor, and a showing and proof of facts satisfying the requirements of the said section having been submitted it is this 11th day of August 1981, certified that the name of the said George Edwin Mock is hereby added to the said patent as a joint inventor with the said Arthur Merle Isley, Robert Wayne Rake and Albert Sanford Tingley.

Fred W. Sherling
*Associate Solicitor.*